(12) United States Patent
Eijdenberg et al.

(10) Patent No.: US 10,592,998 B2
(45) Date of Patent: Mar. 17, 2020

(54) GRAPHICAL USER INTERFACE BASED AIRLINE TRAVEL PLANNING

(71) Applicant: GOOGLE INC., Mountain View, CA (US)

(72) Inventors: Adam Eijdenberg, Roslindale, MA (US); Gregory R. Galperin, Cambridge, MA (US)

(73) Assignee: Google LLC, Mountain View, CA (US)

(*) Notice: Subject to any disclaimer, the term of this patent is extended or adjusted under 35 U.S.C. 154(b) by 536 days.

(21) Appl. No.: 14/952,959

(22) Filed: Nov. 26, 2015

(65) Prior Publication Data

US 2016/0155206 A1 Jun. 2, 2016

Related U.S. Application Data

(63) Continuation of application No. 12/841,962, filed on Jul. 22, 2010, now abandoned.

(60) Provisional application No. 61/227,508, filed on Jul. 22, 2009.

(51) Int. Cl.
| | |
|---|---|
| *G06Q 10/00* | (2012.01) |
| *G06Q 50/14* | (2012.01) |
| *G06Q 10/02* | (2012.01) |
| *G06Q 30/06* | (2012.01) |
| *G06Q 10/10* | (2012.01) |

(52) U.S. Cl.
CPC .......... *G06Q 50/14* (2013.01); *G06Q 10/02* (2013.01); *G06Q 10/109* (2013.01); *G06Q 10/1093* (2013.01); *G06Q 30/06* (2013.01)

(58) Field of Classification Search
None
See application file for complete search history.

(56) References Cited

U.S. PATENT DOCUMENTS

| | | |
|---|---|---|
| 5,041,982 A | 8/1991 | Rathnam |
| 5,253,166 A | 10/1993 | Dettelbach et al. |
| 5,570,283 A | 10/1996 | Shoolery et al. |
| 5,790,974 A | 8/1998 | Tognazzini |
| 6,119,186 A | 9/2000 | Watts et al. |
| 6,243,647 B1 | 6/2001 | Berstis et al. |
| 6,275,771 B1 | 8/2001 | Berstis et al. |

(Continued)

OTHER PUBLICATIONS

U.S. Appl. No. 12/841,962 to Eijdenberg et al. filed Jul. 22, 2010.
(Continued)

*Primary Examiner* — Tonya Joseph
(74) *Attorney, Agent, or Firm* — Dority & Manning, PA

(57) ABSTRACT

Graphical user interface (GUI) based methods and systems to generate and revise travel itineraries, including to permit a user to input or select multiple sequential travel destinations and corresponding dates in a calendar based GUI, to generate a travel itinerary using default itinerary parameters, to display the travel itinerary and user configurable itinerary parameter within the GUI, and to revise the travel itinerary in response to user configured itinerary parameters. An itinerary parameter may be configurable to apply to a selected portion of the itinerary or to the entire itinerary. User selectable options may be displayed in a natural language format. User input may be performed with relatively few actions, and may be performed exclusively or nearly exclusively with a pointing device.

17 Claims, 36 Drawing Sheets

(56) References Cited

U.S. PATENT DOCUMENTS

| | | |
|---|---|---|
| 6,327,623 B2 | 12/2001 | Watts |
| 6,353,794 B1 | 3/2002 | Davis et al. |
| 6,477,520 B1 | 11/2002 | Malaviya et al. |
| 6,603,489 B1 | 8/2003 | Edlund et al. |
| 6,710,768 B2 | 3/2004 | Freach et al. |
| 6,826,472 B1 | 11/2004 | Kamei et al. |
| 6,885,734 B1 | 4/2005 | Eberle et al. |
| 7,050,986 B1 | 5/2006 | Vance et al. |
| 7,103,558 B1 | 9/2006 | Patton et al. |
| 7,136,821 B1 | 11/2006 | Kohavi et al. |
| 7,149,961 B2 | 12/2006 | Harville et al. |
| 7,187,278 B2 | 3/2007 | Biffar |
| 7,236,969 B1 | 6/2007 | Skillen et al. |
| 7,263,494 B1 | 6/2007 | Harris |
| 7,256,711 B2 | 8/2007 | Sheha et al. |
| 7,260,390 B1 | 8/2007 | Skinner et al. |
| 7,305,356 B2 | 12/2007 | Rodon |
| 7,379,889 B2 | 5/2008 | Ratzlaff et al. |
| 7,383,252 B2 | 6/2008 | Soogoor |
| 7,395,221 B2 | 7/2008 | Doss et al. |
| 7,421,432 B1 | 9/2008 | Hoelzle et al. |
| 7,428,302 B2 | 9/2008 | Zirngibl et al. |
| 7,444,348 B2 | 10/2008 | Fries et al. |
| 7,451,045 B2 | 11/2008 | Ratliff et al. |
| 7,451,152 B2 | 11/2008 | Kraft et al. |
| 8,788,303 B1 * | 7/2014 | Krone ............... G06Q 50/14 705/5 |
| 2001/0034625 A1 | 10/2001 | Kwoh |
| 2002/0022981 A1 | 2/2002 | Goldstein |
| 2002/0032589 A1 | 3/2002 | Shah |
| 2002/0065688 A1 | 5/2002 | Charlton et al. |
| 2002/0065689 A1 | 5/2002 | Bingham et al. |
| 2002/0111935 A1 | 8/2002 | Jones et al. |
| 2002/0156661 A1 | 10/2002 | Jones et al. |
| 2003/0023463 A1 | 1/2003 | Dombroski et al. |
| 2003/0050805 A1 | 3/2003 | Gouyet et al. |
| 2003/0055689 A1 | 3/2003 | Block et al. |
| 2003/0120526 A1 | 6/2003 | Altman et al. |
| 2003/0171965 A1 | 9/2003 | Ratzlaff et al. |
| 2004/0193457 A1 | 9/2004 | Shogren |
| 2005/0073443 A1 | 4/2005 | Sheha et al. |
| 2006/0004613 A1 | 1/2006 | Roller et al. |
| 2006/0122872 A1 | 6/2006 | Stevens et al. |
| 2006/0136121 A1 | 6/2006 | Eisen |
| 2006/0206363 A1 | 9/2006 | Gove |
| 2007/0050360 A1 | 3/2007 | Hull et al. |
| 2007/0083401 A1 | 4/2007 | Vogel et al. |
| 2007/0143155 A1 | 6/2007 | Whitsett et al. |
| 2007/0143156 A1 | 6/2007 | van Deursen |
| 2007/0174097 A1 | 7/2007 | Gillespie |
| 2007/0185744 A1 | 8/2007 | Robertson |
| 2008/0004794 A1 | 1/2008 | Horvitz |
| 2008/0010229 A1 | 1/2008 | Lee Shu Tak |
| 2008/0016442 A1 | 1/2008 | Khoo |
| 2008/0021728 A1 | 1/2008 | Khoo |
| 2008/0091481 A1 | 4/2008 | Messa et al. |
| 2008/0103842 A1 | 5/2008 | Johnson |
| 2008/0126143 A1 | 5/2008 | Altman et al. |
| 2008/0167937 A1 | 7/2008 | Coughlin et al. |
| 2008/0167938 A1 | 7/2008 | Meisels et al. |
| 2008/0201178 A1 | 8/2008 | Vizitei |
| 2008/0270384 A1 | 10/2008 | Tak |
| 2008/0282199 A1 | 11/2008 | Gherardi |
| 2011/0022426 A1 | 1/2011 | Eijdenberg et al. |

OTHER PUBLICATIONS

Joseph, "U.S. Office Action issued in copending U.S. Appl. No. 12/841,962, filed Aug. 27, 2015", 13 pages.

Joseph, "U.S. Office Action issued in copending U.S. Appl. No. 12/841,962, filed Mar. 3, 2014", 17 pages.

Joseph, "U,S. Office Action issued in copending U.S. Appl. No. 12/841,962, filed Oct. 10, 2014", 10 pages.

* cited by examiner

1. Tell us who you are.
   Select your home airport, travel policy.

2. Show us your calendar.
   Pencil in where you need to be, when you need to be there.

3. Find your perfect flight.
   If you don't like any part of the itinerary returned, click on any part to edit.

```
Home airport: BOS
Directness: At most 1 extra stop
Cabin: Cheapest available
Fare type: Cheapest available
```

<< Month  < Week                    May - 2008                    Week >  Month >>
Sunday  Monday  Tuesday  Wednesday  Thursday  Friday  Saturday
   4       5       6         7          8       9        10
  11      12      13        14         15      16        17
  18      19      20        21         22      23        24
  25      26      27        28         29      30        31
June 1    2       3         4          5       6         7

- shorter - + longer +

< Month  < Week   May - 2008   Week >  Month >>

| Sunday | Monday | Tuesday | Wednesday | Thursday | Friday | Saturday | |
|---|---|---|---|---|---|---|---|
| 4 | 5 | 6 | 7 | LAX | 8 | 9 | 10 Travel from BOS to LAX  Depart:  Arrive: SUN 05/11 17:00 ... MON 05/12 09:00 |
| 11 | 12 | 13 | 14 | ? | 15 | 16 | 17 Travel from LAX to SFO  Depart: TUE 05/13 17:00 ... THU 05/15 09:00  Arrive: |
| 18 | 19 | 20 | 21 | SFO | 22 | 23 |  FRI 05/16 09:00 |
| 25 | 26 | 27 | 28 | 29 | 30 | 31 | policy |
| June 1 | 2 | 3 | 4 | 5 | | | when you need to be | shorter ↕ longer

Location: SEA  [Search]

Cities
- SEA - Seattle - WA - US (includes LKE, SEA, BFI)
- ESH - Shoreham By Sea - undefined - GB (includes ESH)
- SAS - Salton Sea - CA - US (includes SAS)
- FBS - Friday Harbor SPB - WA - US (includes FBS)

Airports
- LKE - Seattle Lake Union - Seattle - WA - US
- BFI - Seattle Boeing - Seattle - WA - US
- SEA - Seattle/Tacoma Sea/Tac - Seattle - WA - US
- YAQ - Maple Bay SPB - Maple Bay - BC - CA
- YAV - Miner's Bay SPB - Miner's Bay - BC - CA
- MPB - Miami SPB - Miami - FL - US
- YTP - Tofino SPB - Tofino - BC - CA
- PBK - Pack Creek SPB - Pack Creek - AK - US
- PEC - Pelican SPB - Pelican - AK - US
- ALZ - Alitak SPB - Alitak - AK - US
- RSJ - Rosario SPB - Rosario - WA - US
- YTG - Sullivan Bay SPB - Sullivan Bay - BC - CA
- SPB - St. Thomas SPB - St Thomas Island - VI - US Searching in 2.1 seconds...

itinerary returned, click 300  202  302

| Sun, Jul 18 | Mon, Jul 19 | Tue, Jul 20 | Wed, Jul 21 | Thu, Jul 22 | Fri, Jul 23 | Sat, Jul 24 |
|---|---|---|---|---|---|---|
| BOS | BOS | BOS | BOS | BOS | BOS | BOS |
| 1 AM | 1 AM | 1 AM | 1 AM | 1 AM | 1 AM | 1 AM |
| 2 AM | 2 AM | 2 AM | 2 AM | 2 AM | 2 AM | 2 AM |
| 3 AM | 3 AM | 3 AM | 3 AM | 3 AM | 3 AM | 3 AM |
| 4 AM | 4 AM | 4 AM | 4 AM | 4 AM | 4 AM | 4 AM |
| 5 AM | 5 AM | 5 AM | 5 AM | 5 AM | 5 AM | 5 AM |
| 6 AM | 6 AM | 6 AM | 6 AM | 6 AM | 6 AM | 6 AM |
| 7 AM | 7 AM | 7 AM | 7 AM | 7 AM | 7 AM | 7 AM |
| 8 AM | 8 AM | 8 AM | 8 AM | 8 AM | 8 AM | 8 AM |
| 9 AM | 9 AM | 9 AM | 9 AM | 9 AM | 9 AM | 9 AM |
| 10 AM | 10 AM | 10 AM | 10 AM | 10 AM | 10 AM | 10 AM |
| 11 AM | 11 AM | 11 AM | 11 AM | 11 AM | 11 AM | 11 AM |
| NOON | NOON | NOON | NOON | NOON | NOON | NOON |
| 1 PM | 1 PM | 1 PM | 1 PM | 1 PM | 1 PM | 1 PM |
| 2 PM | 2 PM | 2 PM | 2 PM | 2 PM | 2 PM | 2 PM |
| 2 PM | 2 PM | 2 PM | 2 PM | 2 PM | 2 PM | 2 PM |
| 4 PM | 4 PM | 4 PM | 4 PM | 4 PM | 4 PM | 4 PM |
| 5 PM | 5 PM | 5 PM | 5 PM | 5 PM | 5 PM | 5 PM |
| 6 PM | 6 PM | 6 PM | 6 PM | 6 PM | 6 PM | 6 PM |
| 7 PM | 7 PM | 7 PM | 7 PM | 7 PM | 7 PM | 7 PM |
| 8 PM | 8 PM | 8 PM | 8 PM | 8 PM | 8 PM | 8 PM |
| 9 PM | 9 PM | 9 PM | 9 PM | 9 PM | 9 PM | 9 PM |
| 10 PM | 10 PM | 10 PM | 10 PM | 10 PM | 10 PM | 10 PM |
| 11 PM | 11 PM | 11 PM | 11 PM | 11 PM | 11 PM | 11 PM |

GRAPHICAL USER INTERFACE BASED AIRLINE TRAVEL PLANNING

REFERENCE TO RELATED APPLICATIONS

This application is a continuation of U.S. patent application Ser. No. 12/841,962 filed Jul. 22, 2010 and entitled "Graphical User Interface Based Airline Travel Planning," which claims priority to U.S. Provisional Patent Application No. 61/227,508 filed on Jul. 22, 2009 and entitled "Graphical User Interface Based Airline Travel Planning," the complete disclosures of which are hereby fully incorporated herein by reference.

BACKGROUND

Flights for relatively simple round trip travel plans may be identified using conventional computer based airline itinerary planning systems.

More complex travel plans may involve multiple destinations and may include destinations in more than one country. Multiple destinations may correspond to business meetings at different locations.

Potential solutions for multiple destination and multiple country travel plans may be relatively numerous and complex, and may involve one-way tickets, multiple travel segments marketed under a single price, multiple airlines, airline partnering arrangements, and combinations thereof.

Entering of travel dates, locations, arrival times, and departure times into conventional computer based itinerary planning systems is keystroke intensive, time consuming, and prone to errors. A user may have to enter and retrieve data separately for different destinations and/or airlines. In the event that a date or time is to be adjusted, such as to identify alternative solutions or to accommodate changes to the travel plans, a considerable amount of data may have to be re-entered.

BRIEF DESCRIPTION OF THE DRAWINGS

FIG. 2 is an example graphical user interface (GUI), including a calendar image.

FIG. 3 is another example GUI, including a list of user selectable destinations proximate to the calendar image.

FIG. 36 is an example calendar portion of an example GUI, in accordance with certain example embodiments.

Figure 1:
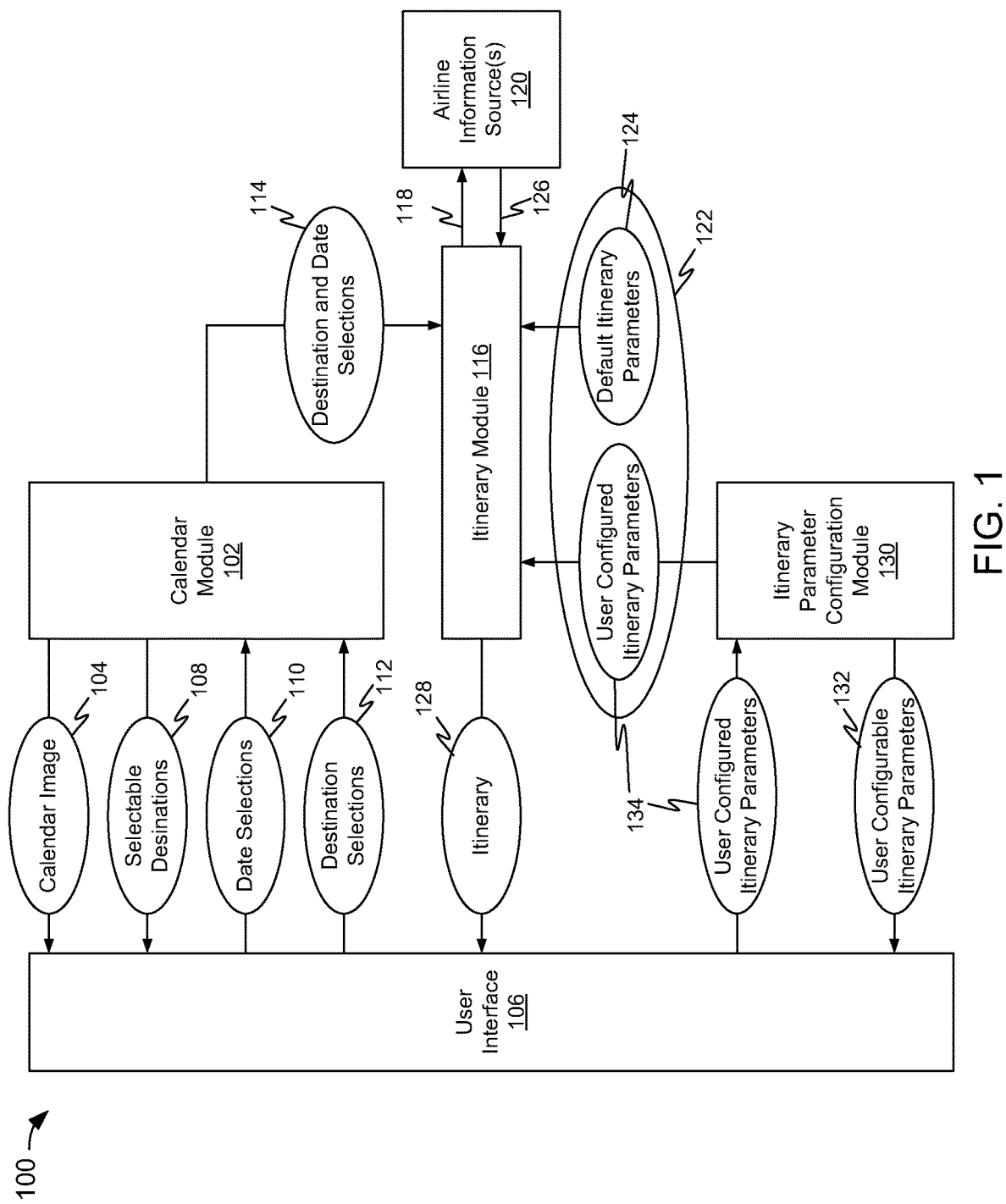
FIG. 1 is a block diagram and of an example environment 100 to generate and revise a travel itinerary in response to user input.

In the drawings, the leftmost digit(s) of a reference number identifies the drawing in which the reference number first appears.

DETAILED DESCRIPTION

Disclosed herein are methods and systems to generate and revise airline travel itineraries, including relatively succinct itineraries for relatively complex travel plans. Also disclosed herein are graphical user interface (GUIs) based methods and systems to permit users to input travel plans and to configure itinerary parameters to a computing device, such a computer system or hand-held communication device, with relatively few actions. For example, travel plans may be input through a GUI exclusively or substantially exclusively with a pointing device such as a mouse, a tactile sensor such as a touch pad, trackpad, and/or scrolling trackpad, a scroll wheel, and combinations thereof.

FIG. 1 is a block diagram of an environment 100 to generate and revise a travel itinerary in response to user input. FIGS. 2 through 11 illustrate a sequence of graphical user interfaces (GUIs). Environment 100 is described below with respect to FIGS. 2 through 10, for illustrative purposes. Environment 100 is not, however, limited to the examples of FIGS. 2 through 11.

Environment 100 includes a calendar module 102 to render a calendar image 104 to a display of a user interface 106. Calendar image 104 may include user selectable days or dates of calendar image 104. FIG. 2 is a graphical user interface (GUI) 200, including a calendar image 202.

Calendar module 102 may be configured to receive date selections 110 from an input device of user interface 106, which may include, without limitation, one or more of a pointing device, a speech recognition system, and a keyboard.

Calendar module 102 may be configured to display indications of user selectable destinations 108. User selectable destinations 108 may be displayed proximate to calendar image 104, and may be displayed in response to a date selection 110. User selectable destinations 108 may include one or more of airport names and geographical identifications, such as city names. FIG. 3 is a GUI 300, including a list of user selectable destinations 302 proximate to calendar image 202.

Calendar module 102 may be configured to receive destination selections 112 from the input device of user interface 104, such as described above with respect to date selections 110.

Calendar module 102 may be configured to output destination and date selections 114 to an itinerary module 116.

Itinerary module 116 may be configured to initiate queries 118 of one or more airline information sources 120 for flight information based at least in part on destination and date selections 114. Queries 118 may be correspond to one or more of flight schedules, fare information, low fare search information, availability information, rewards program information, reservation systems, and services information.

Queries 118 are based at least in part on one or more itinerary parameters 122. Itinerary parameters 122 may include one or more default itinerary parameters 124, which may associated with a user and/or entity profile. Default itinerary parameters 124 may include, for example and without limitation, one or more of a default departure airport, a default return airport, and default travel times, and may include one or more travel preferences, such as preferences associated with airline carriers and services.

Itinerary module 116 may be configured to communicate destination and date selections 114, and itinerary parameters 122, or portions thereof, to one or more search engines that are configured to generate queries 118. Alternatively, or additionally, itinerary module 116 may include one or more search engines to generate and communicate at least a portion of queries 118.

Itinerary module 116 is configured to receive query results 126 from airline information sources 120 and to output an itinerary 128 to user interface 106.

Query results 126 may include one or more of multiple flights, legs, or layovers between destinations, multiple flights or segments that are sold as a package, multiple airline carriers and/or partners, and combinations of round trip and one-way flights.

Query results 126 may include multiple potential solutions, and itinerary module 116 may be configured to select a single set of flights that satisfy destination and date selections 114 and corresponding itinerary parameters 122. This may reduce time and effort required of a user to review and potential revise multiple potential solutions.

Itinerary module 116 may be configured to select the single set of flights in conjunction with a low fare search engine.

Figure 4:
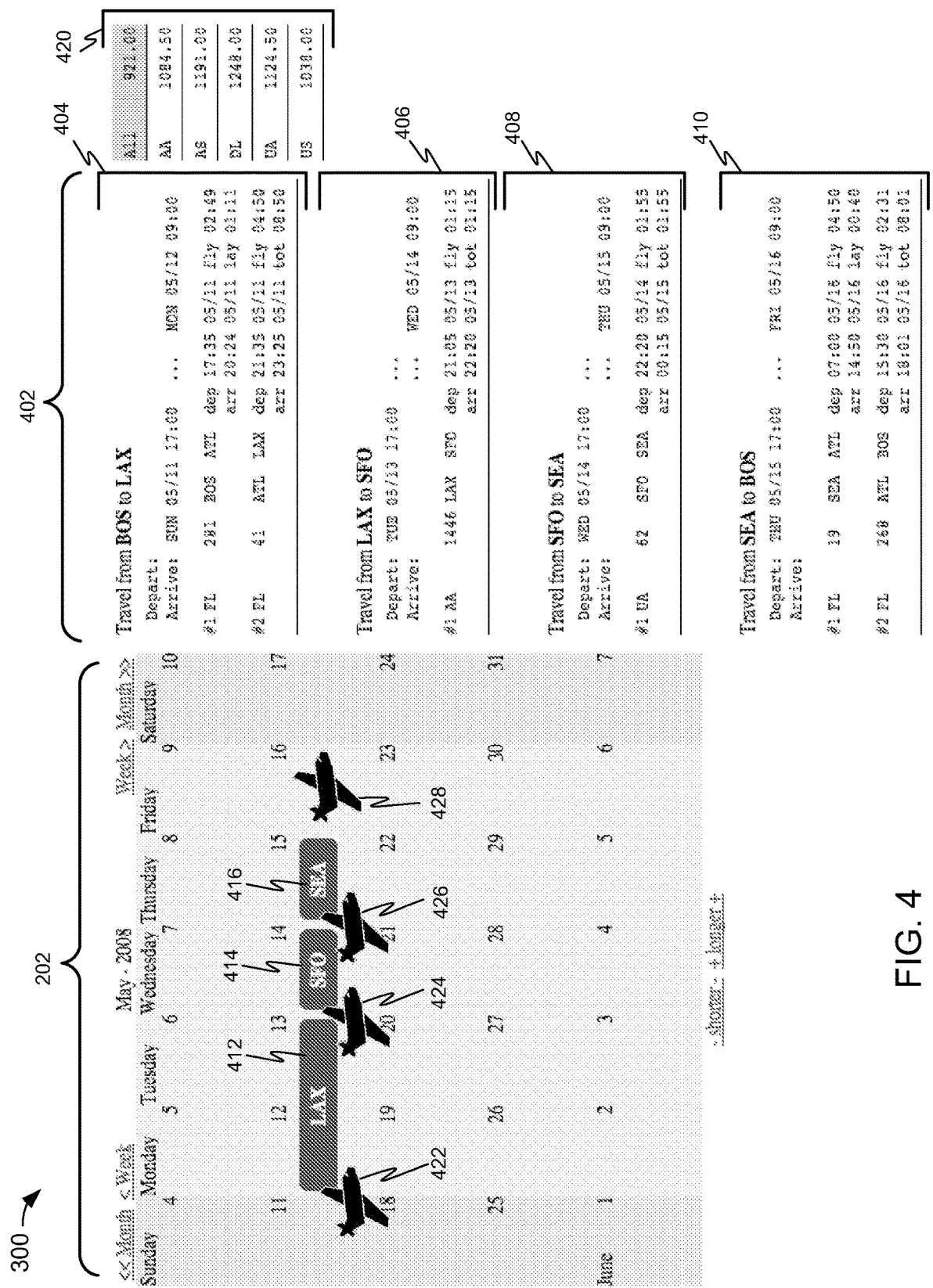
FIG. 4 is another example GUI, including a multiple destination itinerary proximate to the calendar image.

FIG. 4 is a GUI 400, wherein destination and date selections 114 of FIG. 1 include LAX 412 on Tuesday, May 12 and Wednesday, May 13, SFO 414 on Wednesday, May 14, and SEA 416 on Thursday, May 15.

GUI 400 includes a corresponding multiple destination flight itinerary 402 proximate to calendar image 202. Default itinerary parameters 124 (FIG. 1) may specify BOS as a default originating and a final destination airport. Accordingly, itinerary 402 includes a first portion 404 departing BOS for LAX on Sunday, May 11, a second portion 406 departing LAX for SFO on Tuesday, May 13, a third portion 408 departing SFO for SEA on Wednesday, May 14, and a fourth portion 410 departing SEA for BOS on Thursday, May 15.

Default itinerary parameters 124 may further include a default preferred arrival time or a latest arrival, such as 9:00 AM, and a default preferred departure time or an earliest departure time, such as 5:00 PM.

Returning to FIG. 1, environment 100 may include an itinerary parameter configuration module 130 to permit user adjustment and/or configuration of one or more itinerary parameters 122, such as with a pointer-selectable natural language formatted configuration options.

Itinerary parameter configuration module 130 may be configured to render user configurable itinerary parameters 132 in response to user input corresponding to fields of itinerary 128. One or more user configurable itinerary parameters 132 may include an option to apply the corresponding parameter to a selected portion of itinerary 120 or to all of itinerary 128.

Itinerary parameter configuration module 130 may be configured to provide user configured itinerary parameters 134 to itinerary module 116. Itinerary module 116 may be configured to revise itinerary 128 in response to user configured itinerary parameters 134.

Example user configurable itinerary parameters are disclosed below with respect to FIGS. 5 through 11.

Figure 5:
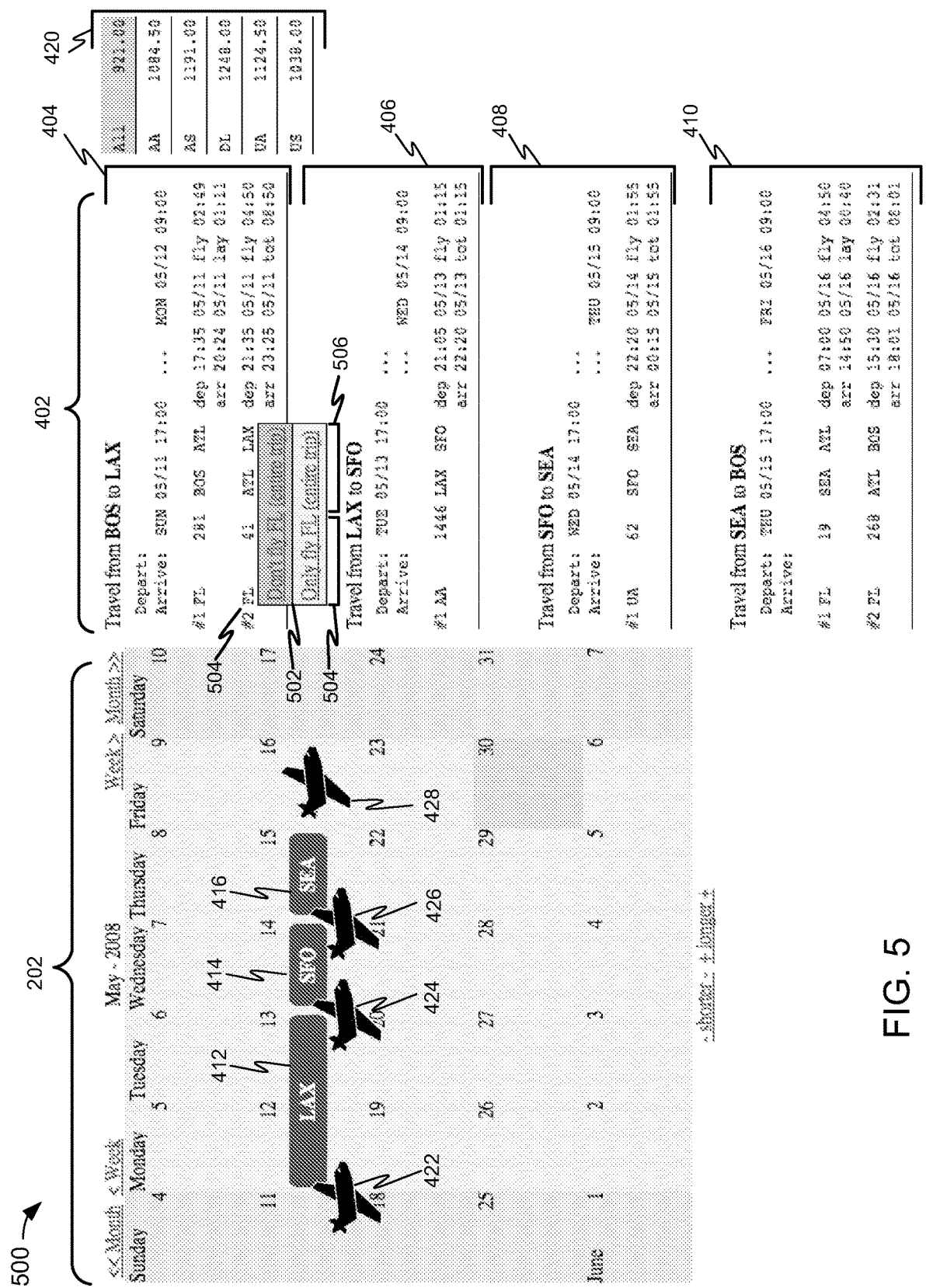
FIG. 5 is another example GUI, including a user configurable itinerary parameter associated with an airline carrier.

FIG. 5 is a GUI 500, including a user configurable itinerary parameter 502 associated with a field 504 of itinerary portion 404. Field 504 corresponds to an airline carrier identifier, shown here as FL. Parameter 502 may be displayed in response to cursor activity with respect to a field 504. Parameter 502 is user configurable to either exclude airline carrier FL or to use airline carrier FL exclusively. Parameter 502 is further configurable to be applied to solely to itinerary portion 404 or to all of itinerary 402, in response to a user selection at one of 504 and 506, respectively.

Figure 6:
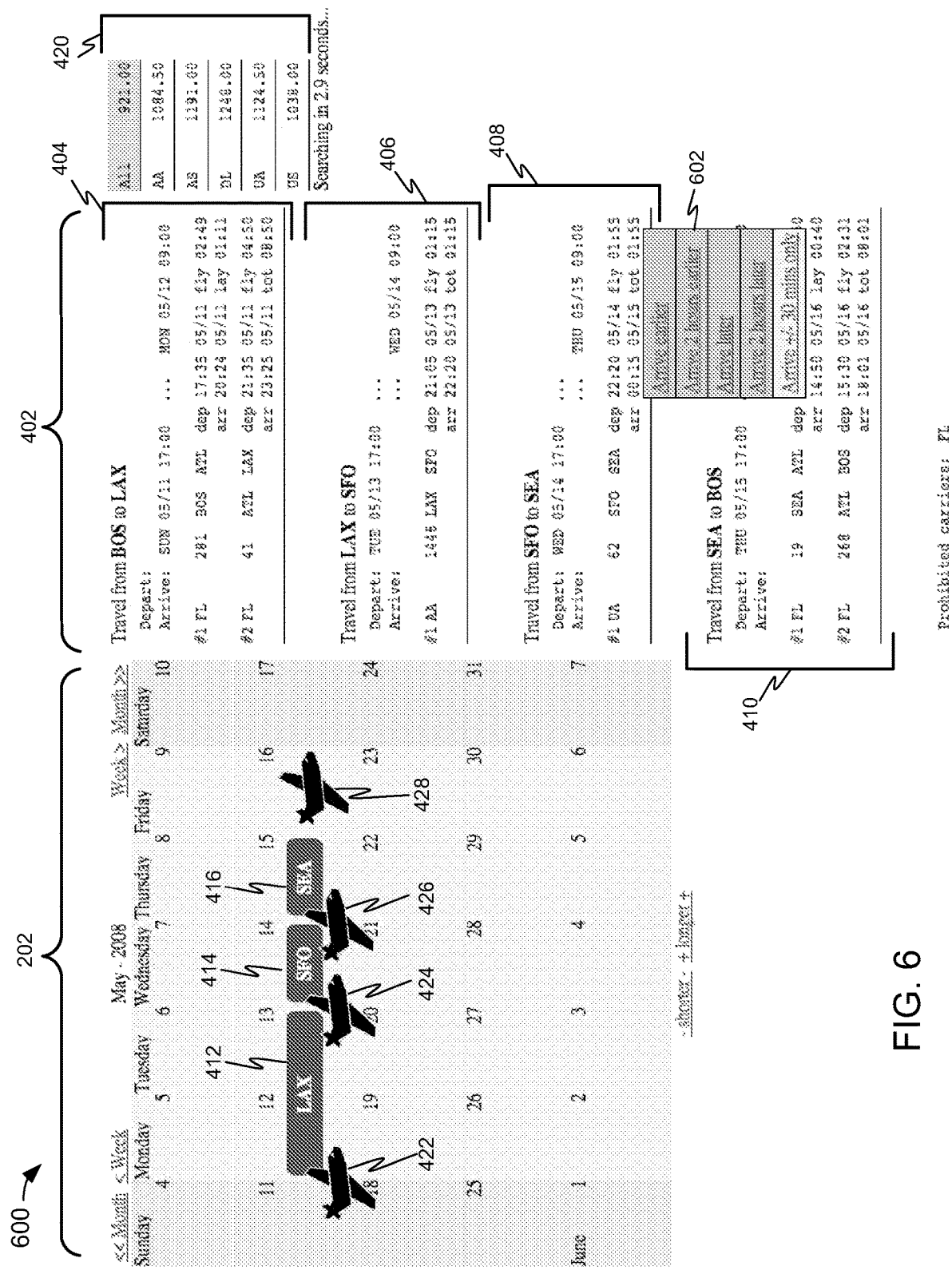
FIG. 6 is another example GUI, including a user configurable itinerary parameter associated with an arrival time.

FIG. 6 is a GUI 600, including a user configurable arrival time parameter 602 associated with itinerary portion 408. Arrival time parameter 602 may be displayed in response to cursor activity with respect to an arrival time field of itinerary portion 408. Arrival time parameter 602 may include a plurality of user selectable natural language based arrival time options, such as illustrated in FIG. 6.

Figure 7:
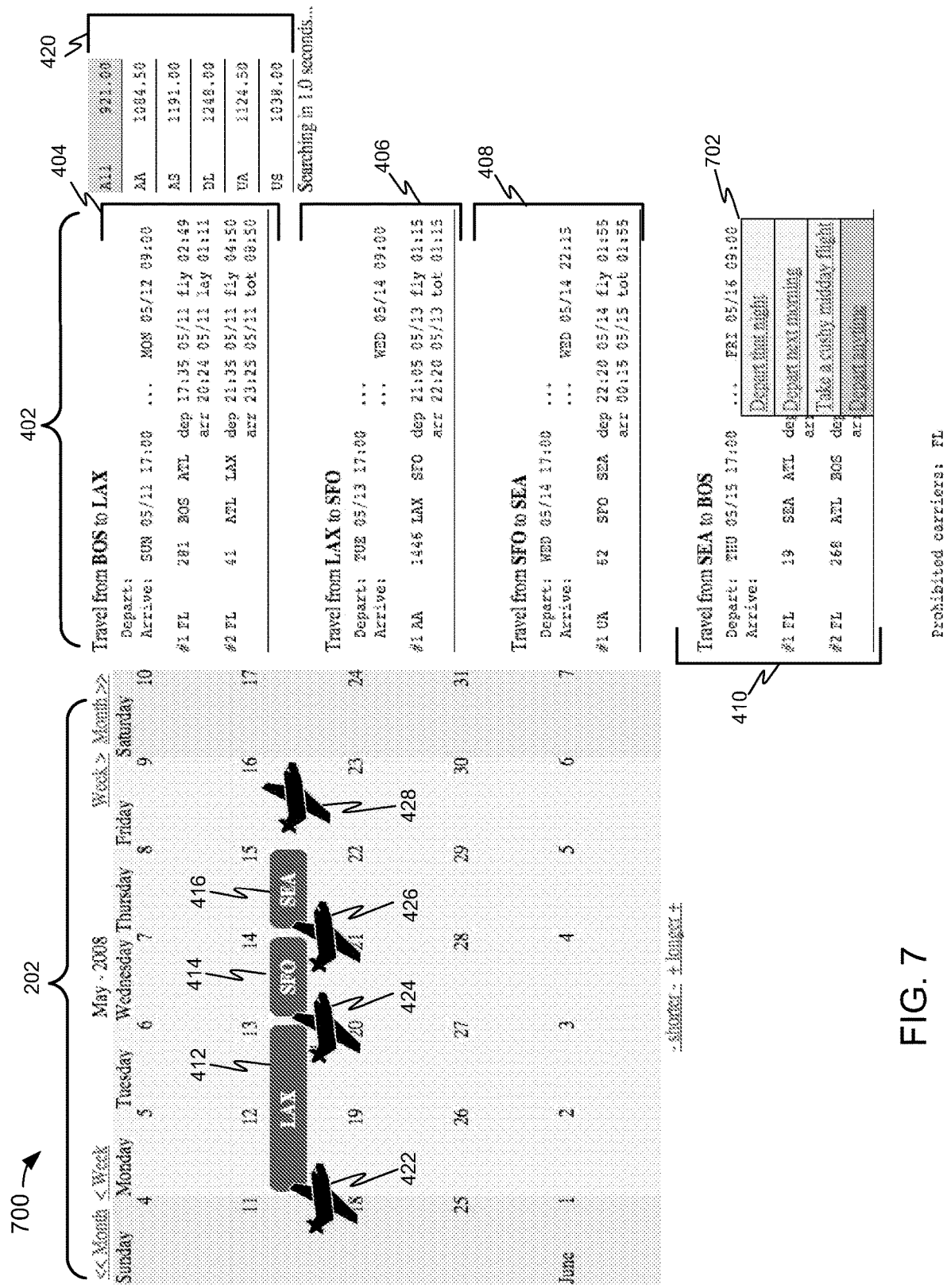
FIG. 7 is another example GUI, including a user configurable itinerary parameter associated with a departure time.

FIG. 7 is a GUI 700, including a user configurable departure time parameter 702 associated with a departure time of itinerary portion 410. Departure time parameter 702 may be displayed in response to cursor activity with respect to an departure time field of itinerary portion 410. Departure time parameter 702 may include a plurality of user selectable natural language based departure time options, such as illustrated in FIG. 7, which may include one or more time ranges.

Figure 8:
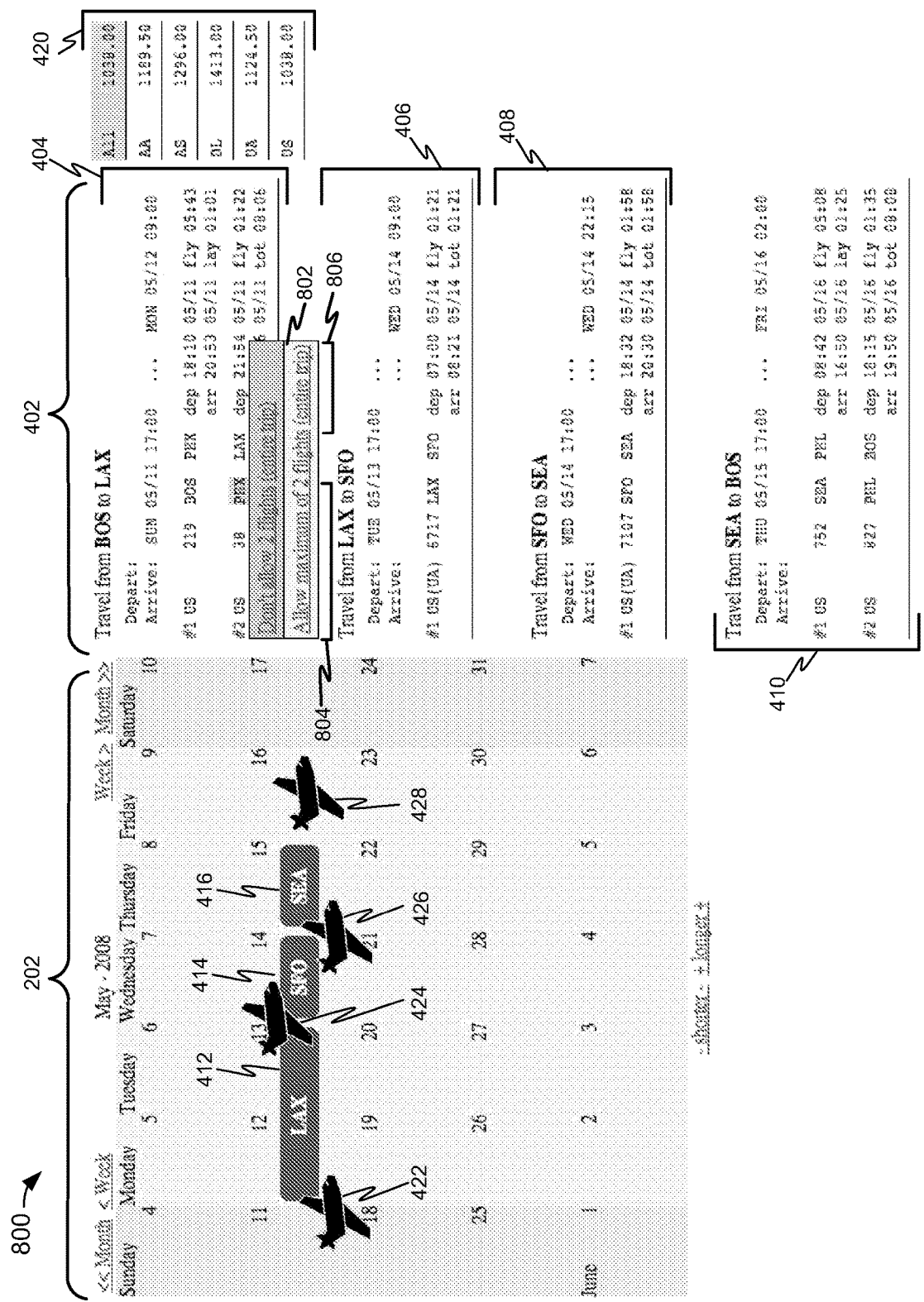
FIG. 8 is another example GUI, including a user configurable itinerary parameter associated with a number of permissible legs or flights.

FIG. 8 is a GUI 800, including a user configurable itinerary parameter 802 associated with itinerary portion 404. Parameter 802 may be displayed in response to cursor activity with respect to a field within itinerary portion 404. Parameter 802 is configurable for a permissible number of legs. Parameter 802 is further configurable to apply the permissible number of legs solely to itinerary portion 404 or to each of itinerary portions 404 through 410, in response to a user selection at one of 804 and 806, respectively.

In the example of FIG. 8, itinerary portions 404 through 410 are revised relative to FIG. 7, in response to user configured itinerary parameters described above.

Figure 9:
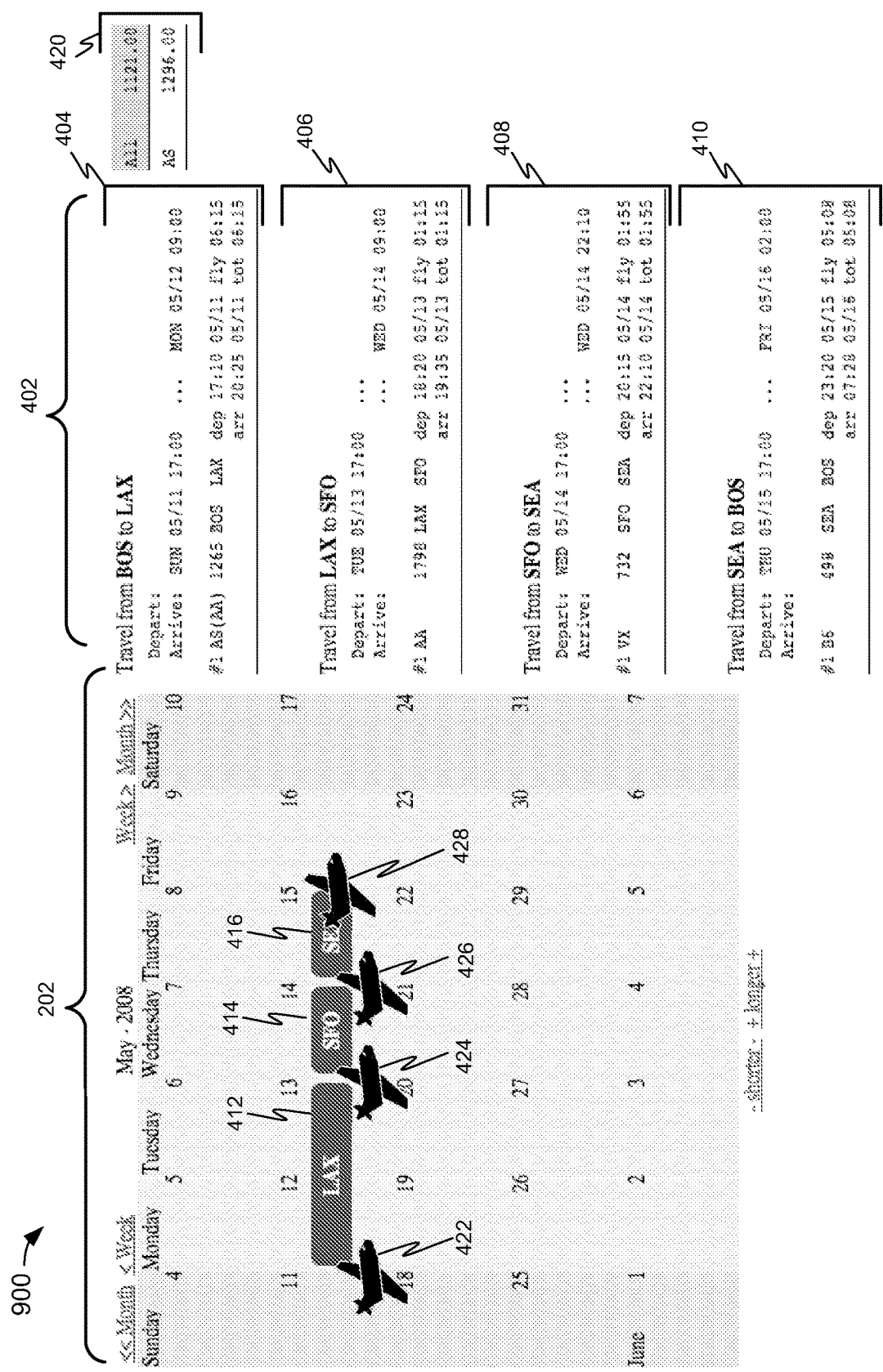
FIG. 9 is another example GUI, wherein the itinerary is revised relative to FIG. 8 in response to user configured itinerary parameters.

FIG. 9 is a GUI 900, wherein itinerary 402 is revised relative to FIG. 8, in response to user configured itinerary parameters described above.

Figure 10:
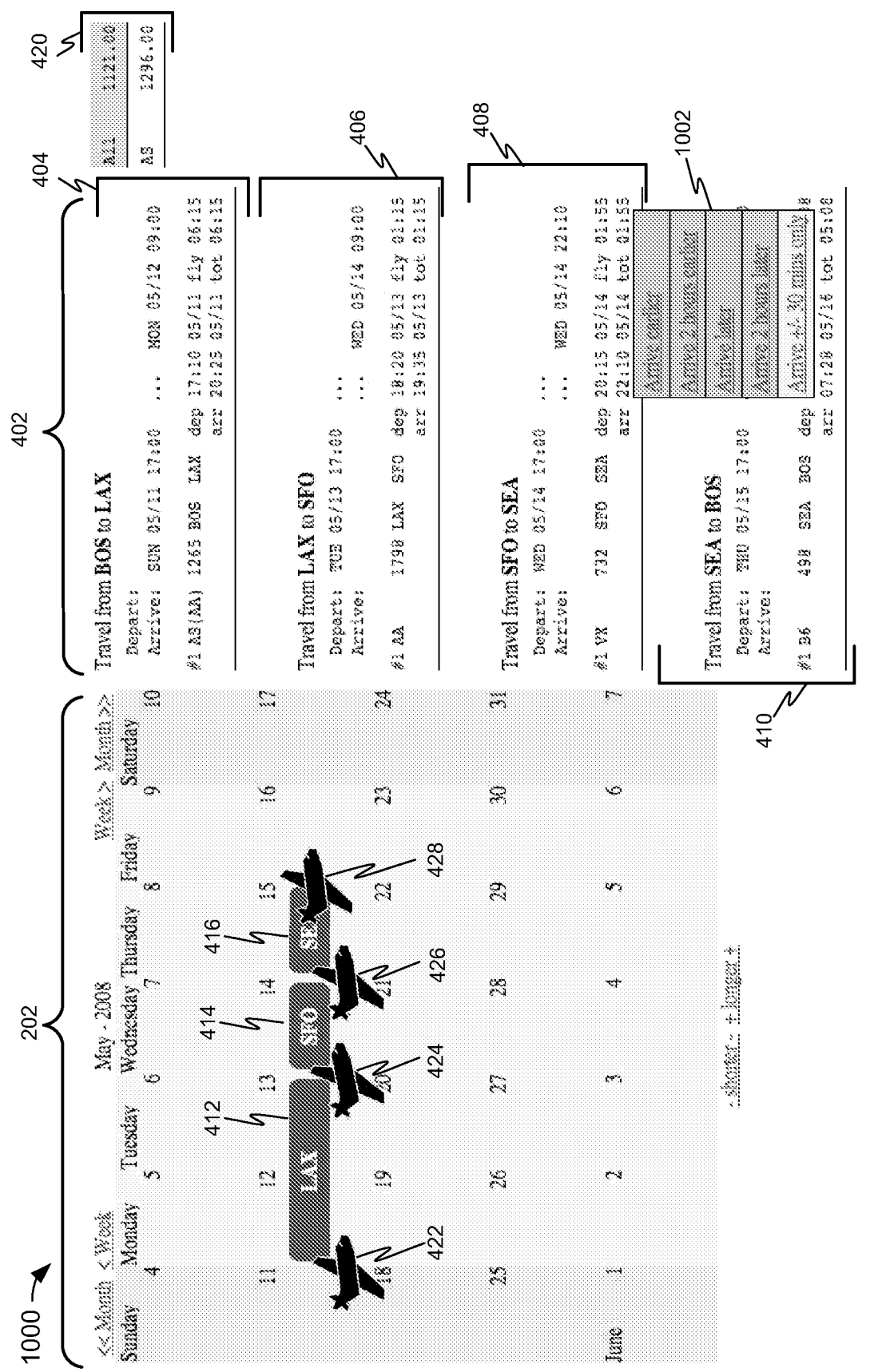
FIG. 10 is another example GUI, including a user configurable itinerary parameter associated with an arrival time.

FIG. 10 is a GUI 1000, including a user configurable arrival time parameter 1002 associated with an arrival time of itinerary portion 410, such as described above with respect to FIG. 6.

Figure 11:
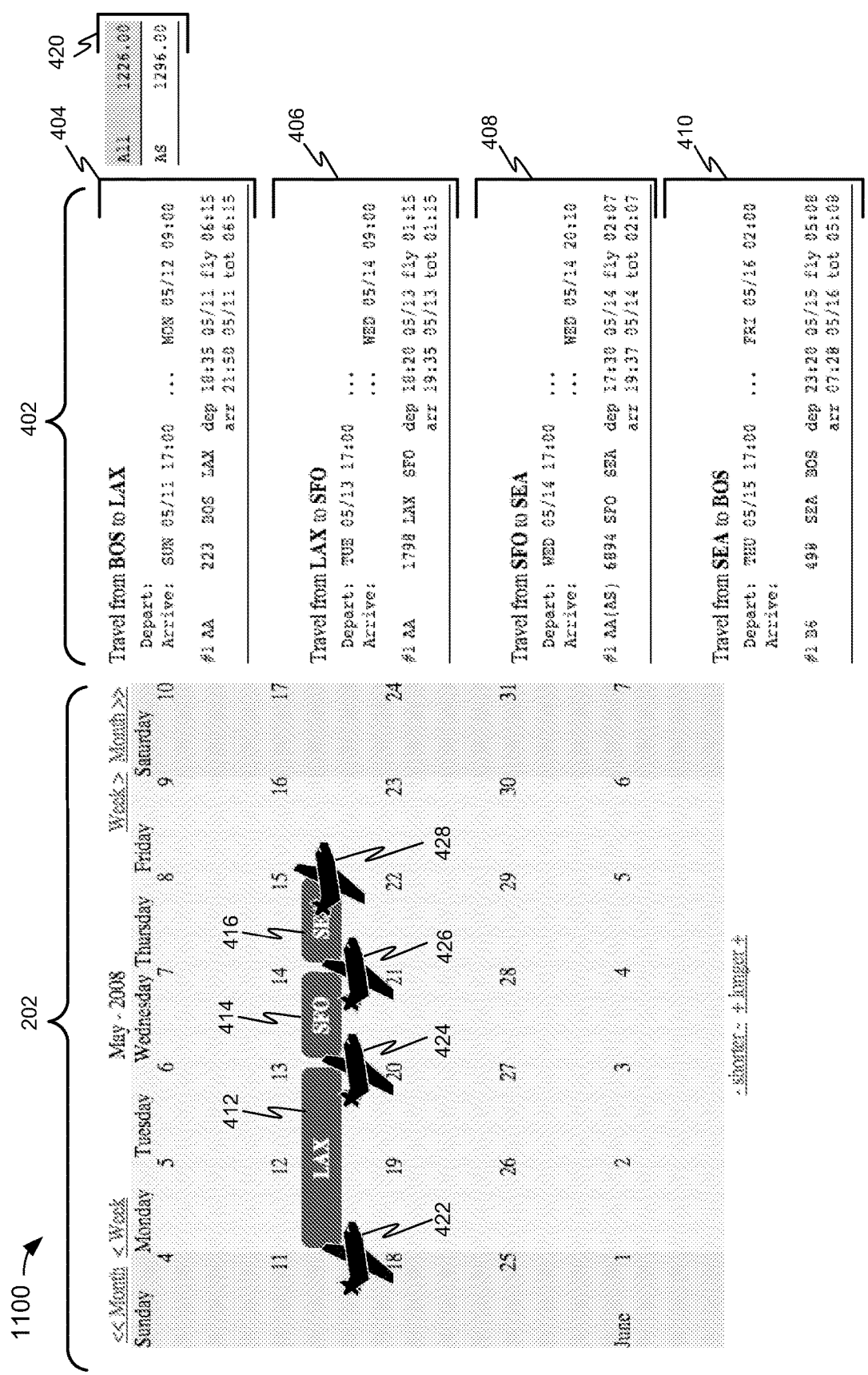
FIG. 11 is another example GUI, wherein the itinerary is revised relative to FIG. 10 in response to user configured itinerary parameters.

FIG. 11 is a GUI 1100, wherein itinerary 402 is revised relative to FIG. 10, in response to user configured itinerary parameters described above.

Referring back to FIG. 1, user configurable parameters 132 may include one or more selectable flight service option parameters, which may include an option to apply a corresponding parameter to a selected portion of itinerary 128 or all of itinerary 128.

User configurable parameters 132 may include a configurable seat assignment parameter corresponding to availability of user selectable seat assignments, which may include an option to apply a corresponding parameter to a selected portion of itinerary 128 or all of itinerary 128.

One or more of user configurable parameters 132 may be displayed in a natural language format, and may include a plurality of user selectable natural language options, and itinerary parameter configuration module and/or itinerary module 116 may be configured to convert natural language based user selections to a query term. Example natural language configurable itinerary parameters are illustrated in FIGS. 5, 6, 7, 8, and 10.

Itinerary parameter configuration module 130 may be configured to store a history of user configured itinerary parameters 134, and corresponding changes to itinerary 128.

Itinerary parameter configuration module 130 may be configured to receive and display fare information corresponding to flights of itinerary 128. In FIG. 4, a fare display field 420 includes entries corresponding to flights of itinerary 402. In FIGS. 8 and 9, where itinerary 402 is updated or revised, corresponding changes appear in fare display field 420.

Itinerary parameter configuration module 130 may be configured to store a history of fare changes associated with user configured itinerary parameters 134 and corresponding changes to itinerary 128.

Where a plurality of flights or flight segments of itinerary 128 are marketed as a package at a package price, itinerary parameter configuration module 130 may be configured to apportion the package price amongst the plurality of flights or flight segments in proportion to relative values of the corresponding flights. For example, and without limitation, itinerary parameter configuration module 130 may be configured to retrieve a market price associated with each of the plurality of flights when priced individually, and to apportion the package price amongst the plurality of flights in proportion to the corresponding market prices. Alternatively, or additionally, itinerary parameter configuration module 130 may be configured to apportion the package price based on corresponding distances of the flights or flight segments.

Calendar module 102 may be configured to display indications of destination selections 112 proximate to corresponding date selections 110 of calendar image 104. This is illustrated in FIG. 4 as LAX 412, SFO 414, and SEA 416.

Calendar module 102 may be configured to receive user input corresponding to a drag and drop operation that moves the displayed indications of destination selections 112 from a first set of dates to a second set of dates. For example, in FIG. 4, a user may use a pointing device to drag images LAX 412, SFO 414, and SEA 416, from dates May 12 through May 15, to a second set of dates. Calendar module 102 may be configured to invoke itinerary module 116 to revise itinerary 128 in accordance with the second set of dates.

Calendar module 102 and/or itinerary module 116 may be configured to display icons corresponding to flights of itinerary 128 proximate to corresponding dates of calendar image 104, at positions indicative of corresponding flight times.

For example, in FIG. 4, GUI 400 includes icons 422, 424, 426, and 428, corresponding to itinerary portions 404, 406, 408, and 410. Icons 422, 424, 426, and 428 may be positioned relative to images of corresponding departure dates May 11, May 13, May 15, and May 15, and/or arrival dates May 12, May 13, May 15, and May 16. Icons 422, 424, 426, and 428 may be positioned horizontally and/or vertically, relative to the images of the corresponding dates, to indicate relative corresponding flight times. For example, a higher vertical position may correspond to an earlier time of day.

Icons may be repositioned in response to changes in itinerary 402. For example, in FIG. 8, icon 424 is repositioned relative to FIG. 4 in response to changes to corresponding itinerary portion 406. In FIG. 9, icon 424 is repositioned relative to FIG. 8 in response to additional changes to itinerary portion 406. Also in FIG. 9, icon 428 is repositioned from May 16 to May 15 in response to changes to corresponding itinerary portion 410.

In FIG. 1, calendar module 102 may be configured to generate calendar image 104 with multiple time slots per date, such as to permit a user to populate the time slots with scheduled events. Calendar module 102 may be further configured to permit a user to select and associate destinations with specific time slots, such as to indicate scheduled events/meetings at corresponding destination locations. Calendar module 102 and/or itinerary module 116 may be further configured to generate a corresponding itinerary of sequential flights to accommodate multiple events at different destination locations.

Calendar module 102 and/or itinerary module 116 may be configured to allot a travel time or window to a destination location. A travel window may include an arrival window and/or a departure window, which may be configured to permit sufficient time to travel between an airport and a meeting location. A travel window may be based on one or more of a default itinerary parameter 124 and a user configured itinerary parameter 134.

Figure 12:
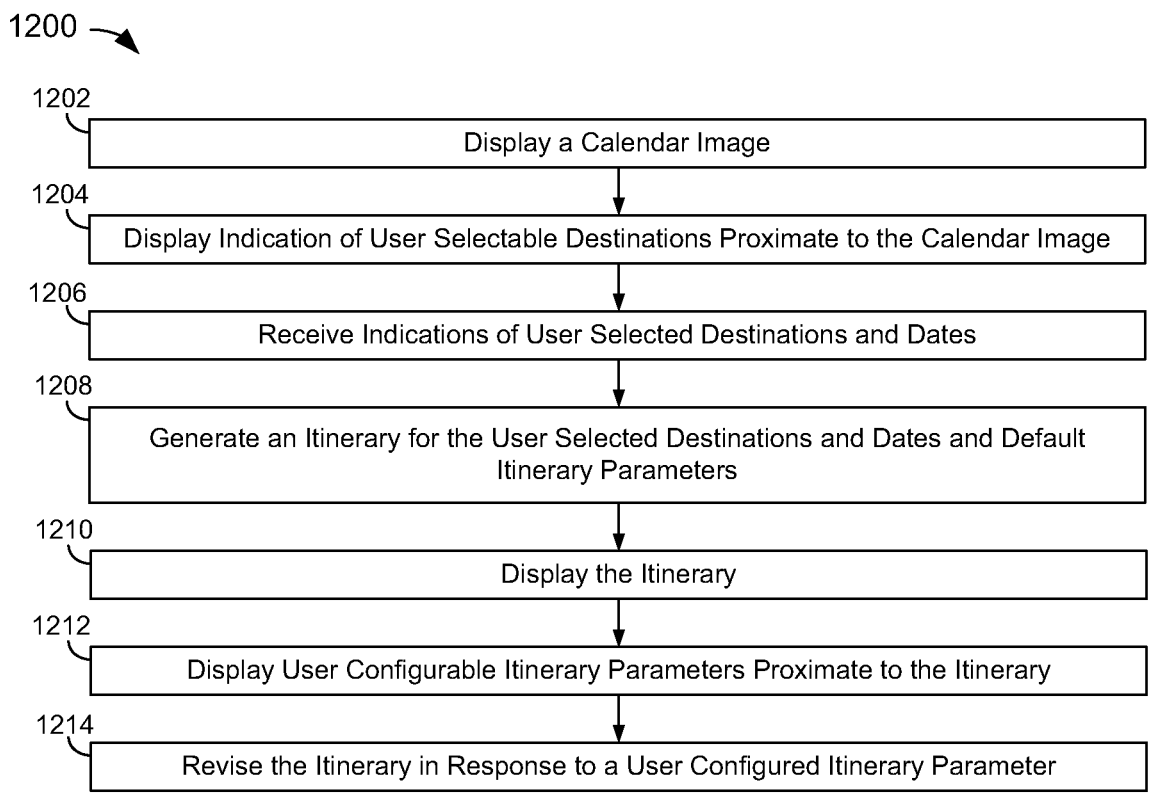
FIG. 12 is a process flowchart of a method of generating, displaying, and revising a travel itinerary in response to user input.

FIG. 12 is a process flowchart of a method 1200 of generating, displaying, and revising a travel itinerary in response to user input. Method 1200 may be implemented to receive user input exclusively or nearly exclusively through a pointing device with few or no keyboard strokes.

At 1202, a calendar image is displayed, such as on a computer display. The calendar image may include images corresponding to days or dates of the calendar.

At 1204, indications of user selectable destinations are displayed proximate to the calendar image. The user selectable destinations may be displayed in response to user input corresponding to a day of the calendar, such as in response to a cursor hovering over the image of the day or in response to input from a pointing device while a cursor is proximate to the image of the day. The user selectable destinations may include a list of locations and/or airports.

At 1206, user input is received indicative of a plurality of user selected destinations and dates. The input may correspond to input from a pointing device and a corresponding cursor position.

At 1208, one or more queries are initiated with respect to one or more airline information sources, and a travel itinerary is constructed from results of the querying. The one or more queries and the itinerary construction may be based on the plurality of user selected destinations, the corresponding user selected dates, and default itinerary parameters, such as described with respect to one or more examples above. The itinerary may include a series of flights from a departure location through each of the user selected destinations, and may include one or more one-way flights.

At 1210, the travel itinerary is displayed. The travel itinerary may be displayed proximate to the calendar image, and may include a plurality of information fields associated with each of the flights.

At 1212, user configurable itinerary parameters are displayed. The user configurable itinerary parameters may be displayed proximate to corresponding information fields, and may be displayed in response to user input associated with the information fields, such as in response to a cursor hovering over an information field or in response to input from a pointing device while the cursor is proximate to the information field. At least a portion of the user configurable itinerary parameters may be configurable for a user-selected portion of the itinerary.

At 1214, a revised itinerary is generated in response to a user configured itinerary parameter.

One or more features disclosed herein may be implemented in hardware, software, firmware, and combinations thereof. The term software, as used herein, refers to a computer program product including a computer readable medium having computer program logic stored therein to cause a computer system to perform one or more features and/or combinations of features disclosed herein.

Figure 13:
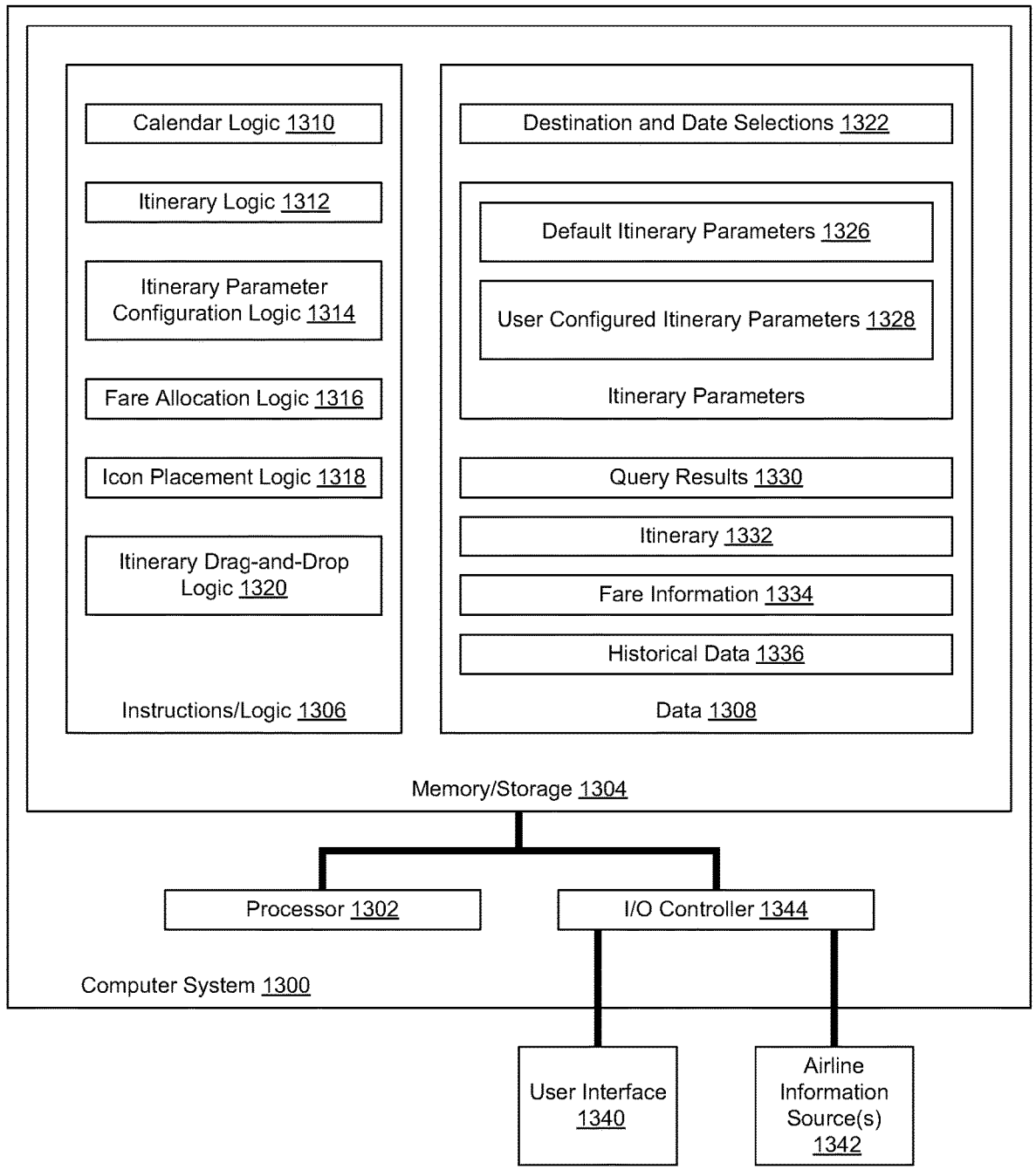
FIG. 13 is a block diagram of an example computer system.

FIG. 13 is a block diagram of a computer system 1300, including one or more instruction processing units, illustrated here as a processor 1302, to execute computer program product logic, also known as instructions, code, and software.

Computer system 1300 includes memory/storage 1304, including a computer readable medium having computer program product logic or instructions 1306 stored thereon, to cause processor 1302 to perform one or more functions in response thereto.

Memory/storage 1304 further includes data 1308 to be used by processor 1302 in executing logic 1306, and/or generated by processor 1302 in response to execution of logic 1306.

In the example of FIG. 13, logic 1306 includes calendar logic 1310 to cause processor 1302 to render a calendar and user selectable dates and destinations to a user interface 1340, and to receive destination and date selections 1322 from user interface 1340, such as described in one or more examples above.

User interface 1340 may include one or more of a display and a user input device, which may include, without limitation, one or more of a pointing device, a speech recognition system, and a keyboard.

Logic 1306 further includes itinerary logic 1312 to cause processor 1302 to initiate one or more queries to one or more airline information sources 1342, to receive query results 1330, and to generate an itinerary 1332, based on destination and date selections 1322 and default itinerary parameters 1326, such as described in one or more examples above.

Logic 1306 further includes itinerary parameter configuration logic 1314 to cause processor 1302 to render user configurable itinerary parameters to user interface 1340, to receive user configured itinerary parameters 1328 from user interface 1340, and to invoke itinerary logic 1312 to revise itinerary 1332 in response to user configured itinerary parameters 1328, such as described in one or more examples above.

Logic 1306 may include logic to cause processor 1302 to receive and display fare information 1334 associated with itinerary 1332, such as described in one or more examples above.

Logic 1306 may include fare allocation logic 1316 to cause processor 1302 to allocate or apportion a price or fare associated with a plurality of flight segments amongst the flight segments, such as described in one or more examples above.

Logic 1306 may include logic to cause processor 1302 to store historical data 1336 associated with changes to one or more of user configured itinerary parameters 1328, itinerary 1332, and fare information 1334, including apportioned fares.

Logic 1306 may include icon placement logic 1318 to cause processor 1302 to display icons corresponding to flights of itinerary 1332 proximate to corresponding dates of the calendar image, at positions indicative of corresponding flight times, such as described in one or more examples above.

Logic 1306 may include itinerary drag and drop logic 1320 to cause processor 1302 to receive user input corresponding to a drag and drop operation that moves the indications of the destinations from a first set of dates to a second set of dates, and to invoke itinerary logic 1312 to revise itinerary 1332 in accordance with the second set of dates, such as described in one or more examples above.

Computer system 1300 may include an input/output (I/O) controller 1344 to communicate with user interface 1340 and airline information sources 1342 over one or more of a wired and a wireless communication channel. I/O controller 1344 may include a network interface controller.

User interface 1340 may be an integral part of computer system 1300 or part of another computer system that is configured to communicate with computer system 1300, such as over a network, which may include an internet connection.

Logic 1306 and data 1308, or portions thereof, may be distributed over multiple computer systems. For example, and without limitation, one or more portions of logic 1306 may run on a computer system 1300, which may represent a server, and one or more other portions of logic 1306 may run on one or more user computer systems having corresponding user interfaces 1340.

Additional example graphical user interfaces (GUIs) are disclosed below with reference to FIGS. 14 through 36.

Figure 14:
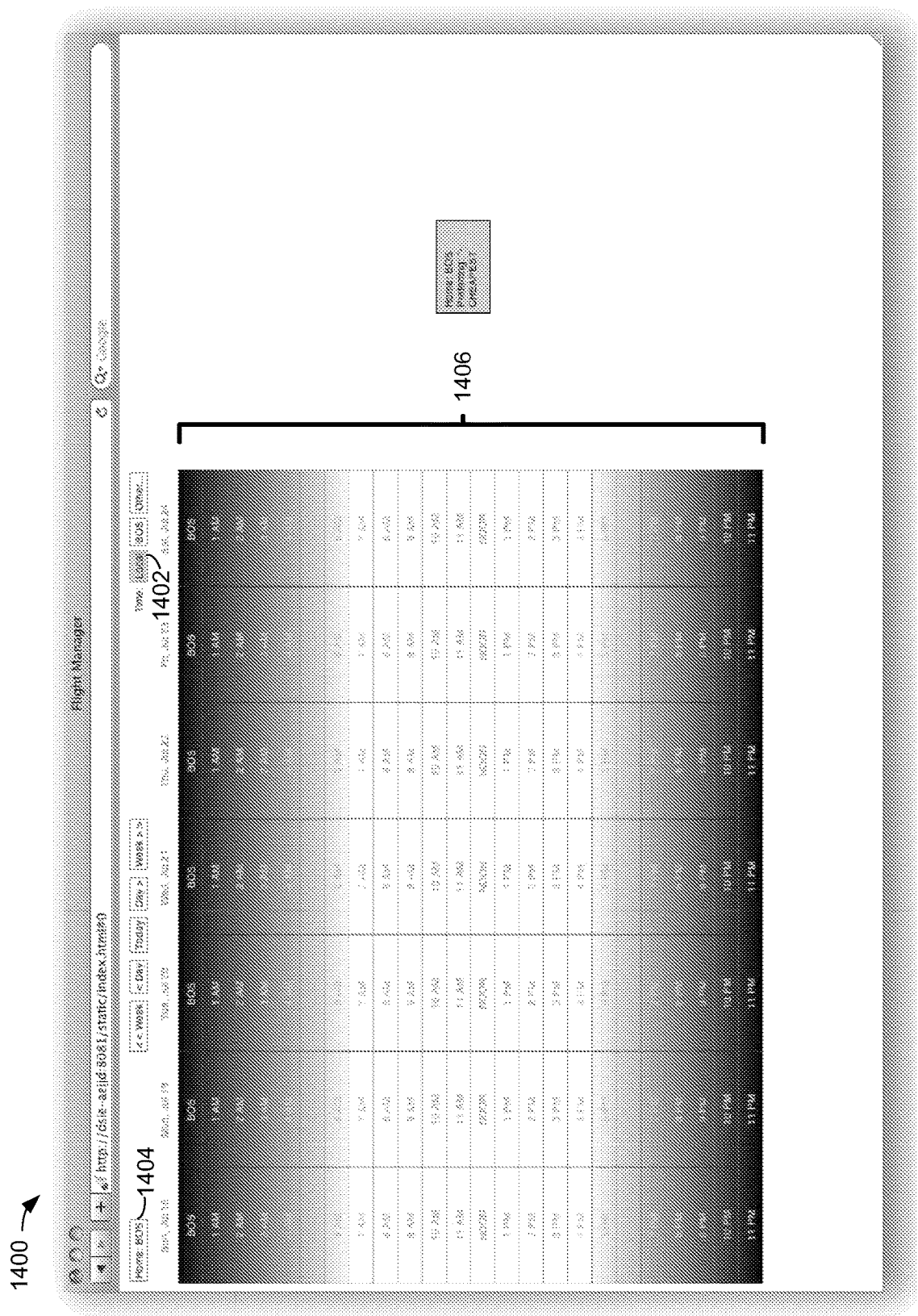
FIG. 14 is another example GUI, in accordance with certain example embodiments.

FIG. 14 is a GUI of a calendar 1400. FIGS. 15, 17-21, and 23-28 are GUIs of calendar 1400. FIGS. 16 and 22 are GUIs of meeting location pop-up windows. FIGS. 14-28 and 36 are described below with respect to an example itinerary planning procedure.

In FIG. 14, calendar 1400 includes a portion 1406 having scheduling time slots within days of a week. FIG. 36 is an image of a week 3600, which may correspond to portion 1406 in FIG. 14.

Calendar 1400 may include one or more calendar entries, which may include scheduled meetings, or meeting entries, and corresponding travel itinerary entries.

Calendar 1400 may be configurable to display calendar entries with respect to a local or default location 1402, and/or one or more other locations. For example, calendar 1400 may be configurable to display meeting and/or itinerary entries with respect to a default time zone, or with respect to a time zone of each meeting, departure time, and arrival time. Calendar 1400 may include a button 1404 to permit a user to select default location 1402. In the example of FIG. 14, calendar 1400 is configured with a default location of BOS, or Boston.

Figure 15:
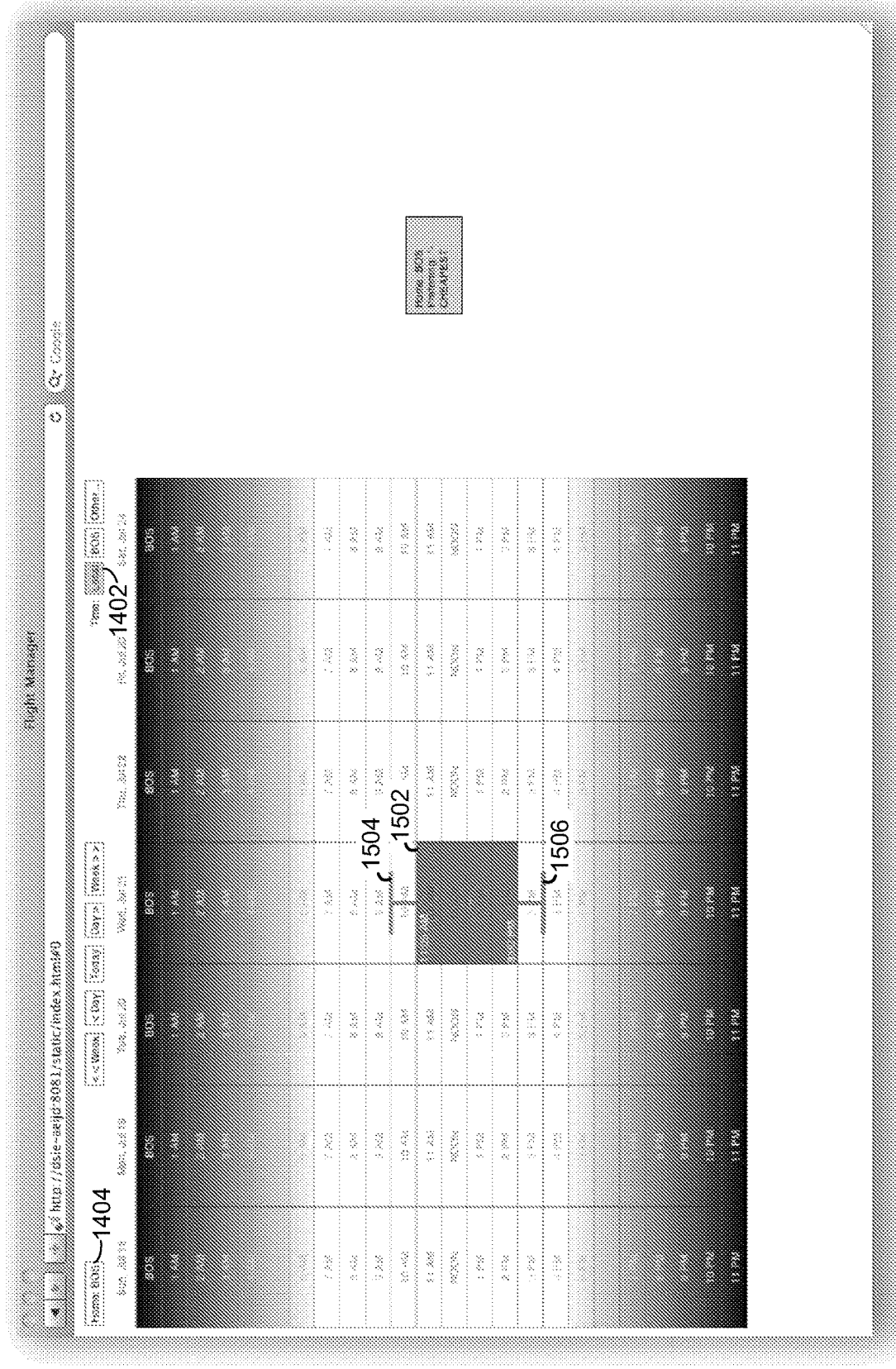
FIG. 15 is another example GUI, in accordance with certain example embodiments.
Figure 16:
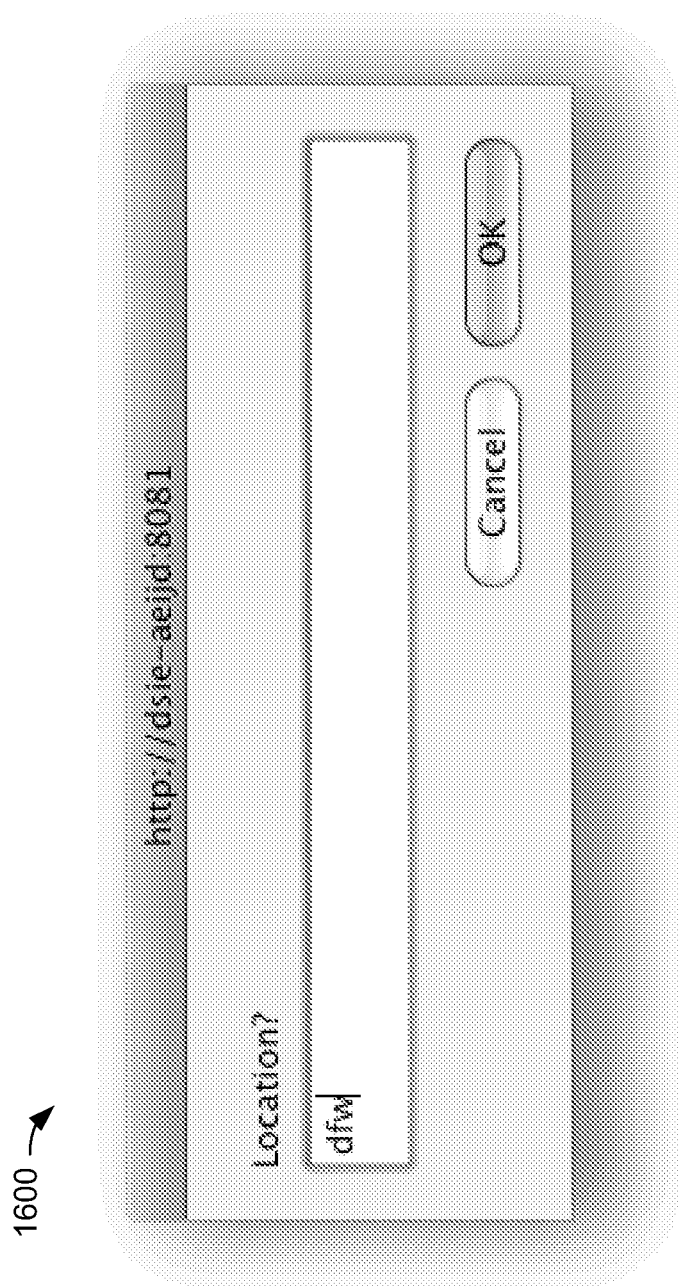
FIG. 16 is an example meeting location element pop-up element, in accordance with certain example embodiments.

In FIG. 15, calendar 1400 is populated with a meeting entry 1502, which may be initiated with a pointing device drag operation between start and end times. In FIG. 15, meeting entry 1502 is illustrated between 11:00 AM and 3:30 PM, local time.

Meeting entry 1502 may include time buffers 1504 and 1506 to provide buffer times prior to and subsequent to meeting entry 1502, respectively. Time buffers 1504 and 1506 may user-adjustable, such as with a pointing device drag operation. Time buffers 1504 and 1506 may be set and/or adjusted, for example, to provide time to travel between an airport and a meeting location, and/or for other purposes.

Time buffers may have default parameters, which may be user-configurable. For example, an initial departure buffer may be set to provide an arrival time after 5 PM one day prior to a meeting. Where one or more subsequent meetings are scheduled at other locations, corresponding pre-meeting buffers may set at, for example, one hour. A post-final-meeting buffer may be set of provide an arrival time, at the local location, prior 9:00 AM one day after a final meeting. Where the distance between the final meeting and the local location is too great permit arrival by 9:00 AM the next day, the post-final-meeting buffer may be automatically adjusted to permit a later arrival time.

In FIG. 16, a meeting location pop-up window 1600 is populated with DFW, for Dallas/Fort Worth.

Figure 17:
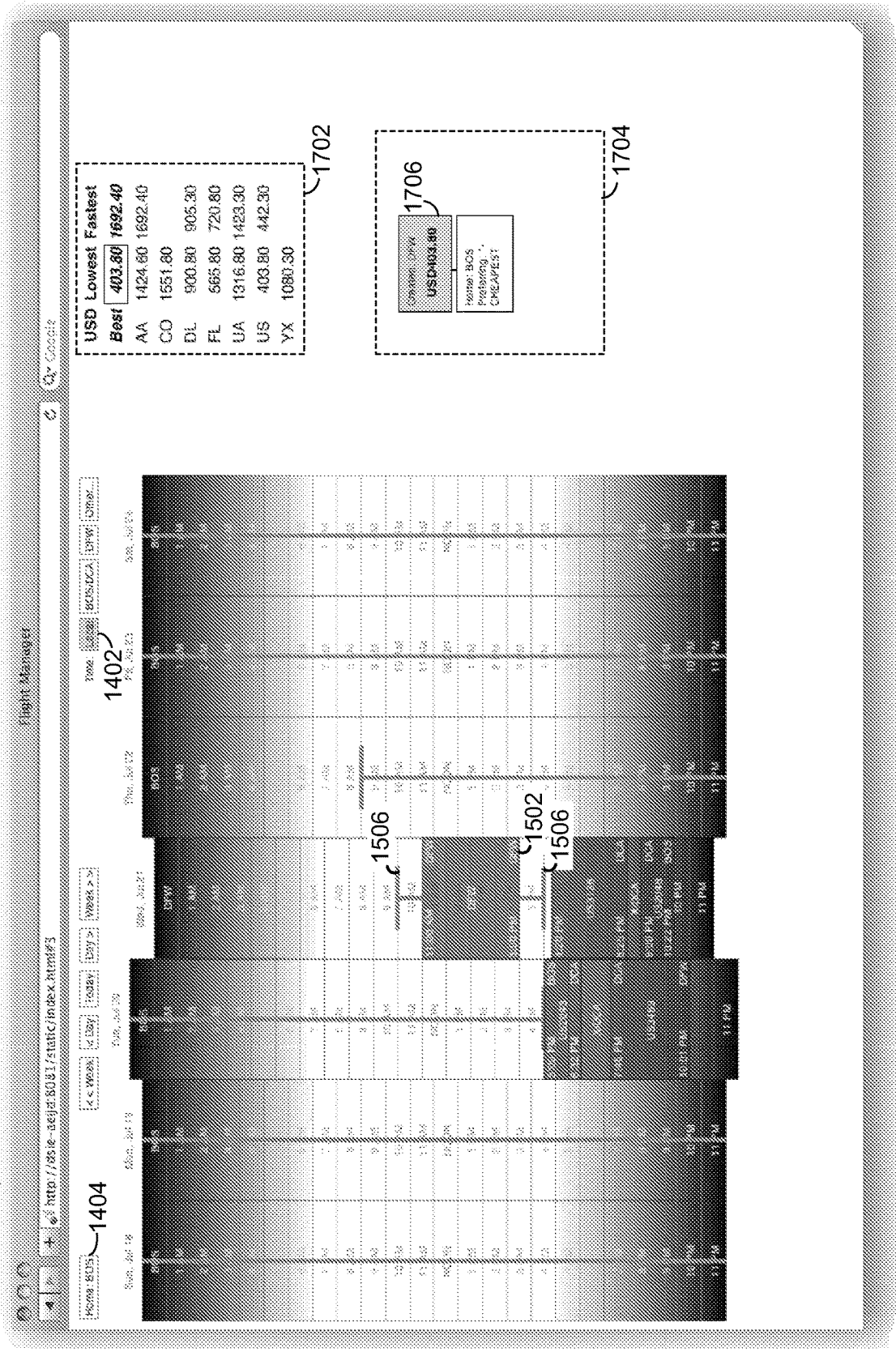
FIG. 17 is another example GUI, in accordance with certain example embodiments.

In FIG. 17, calendar 1400 is updated to reflect DFW within meeting entry 1502, and to display itinerary choices 1702 for meeting entry 1502. Itinerary choices 1702 include a first column to identify carriers, a second column to identify lowest fares of the carriers, and a third column to identify fares or prices associated with fastest flights, or shortest travel times of the carriers.

In FIG. 17, calendar 1400 is also updated with itinerary entries to reflect travel times associated with a user-selected itinerary of itinerary choices 1702. Meeting entry 1502 and the itinerary entries are displayed with respect to local Boston time. As a result, Tuesday, July 20, is illustrated as a relatively long day since an hour of time is gained by travelling westward across a time zone. Conversely, Wednesday, July 21, is illustrated as a relatively short day since an hour is lost traveling east across the time zone.

In FIG. 17, calendar 1400 further includes history information 1704 to display a history of prices for which itineraries have been selected. History information 1704 includes an entry 1706 corresponding to a selected itinerary having a fare of $403.80.

Figure 18:
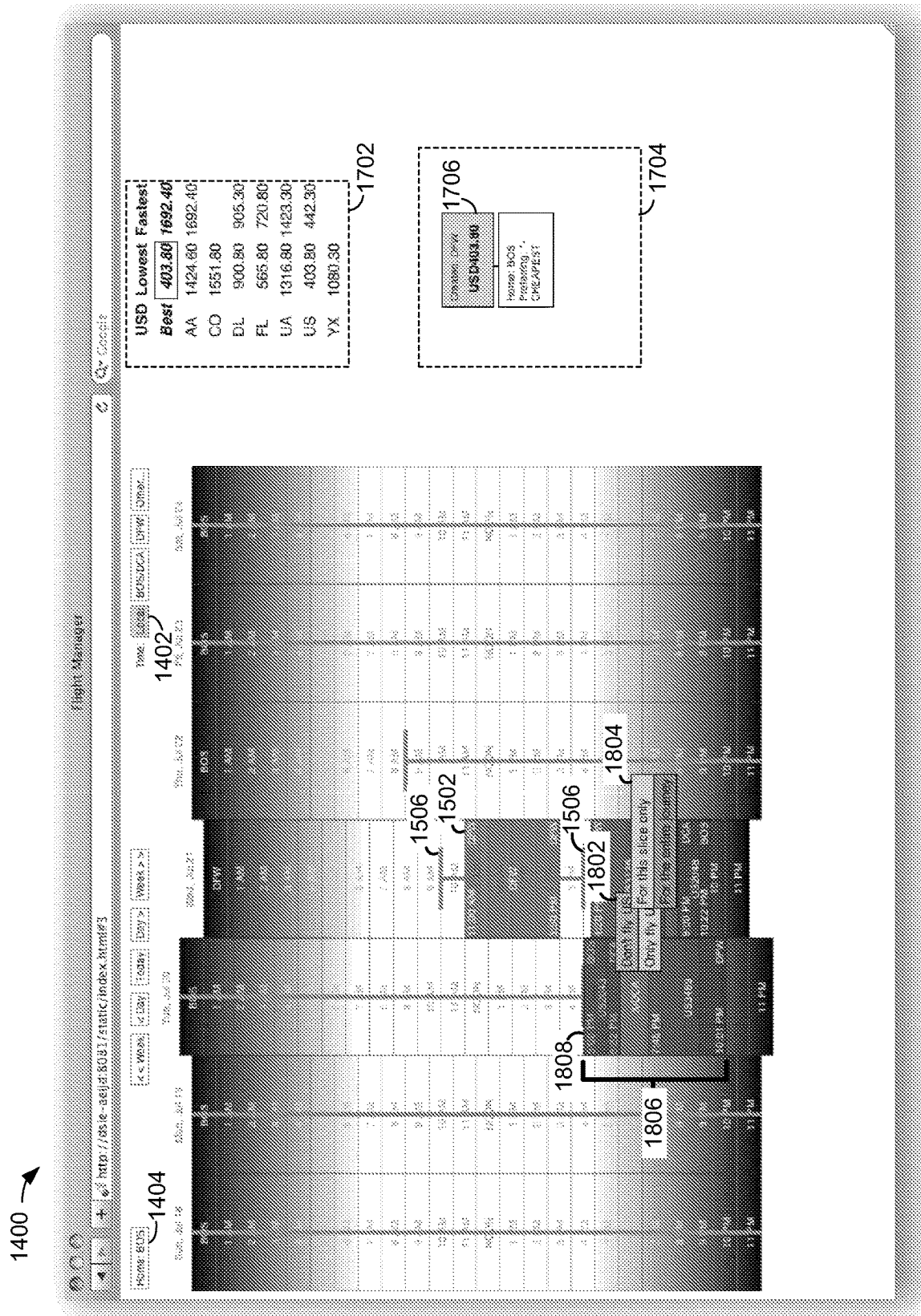
FIG. 18 is another example GUI, in accordance with certain example embodiments.

In FIG. 18, calendar 1400 includes pop-up windows 1802 and 1804. Pop-up window 1802 may be activated by selecting an itinerary entry, such as an itinerary entry 1808 of an itinerary portion or slice 1806. Pop-up window 1802 permits a user to utilize or omit a particular carrier. Pop-up window 1804 permits the user to apply the restriction to itinerary entry 1808, to itinerary portion 1806, or to an entire journey or itinerary.

Figure 19:
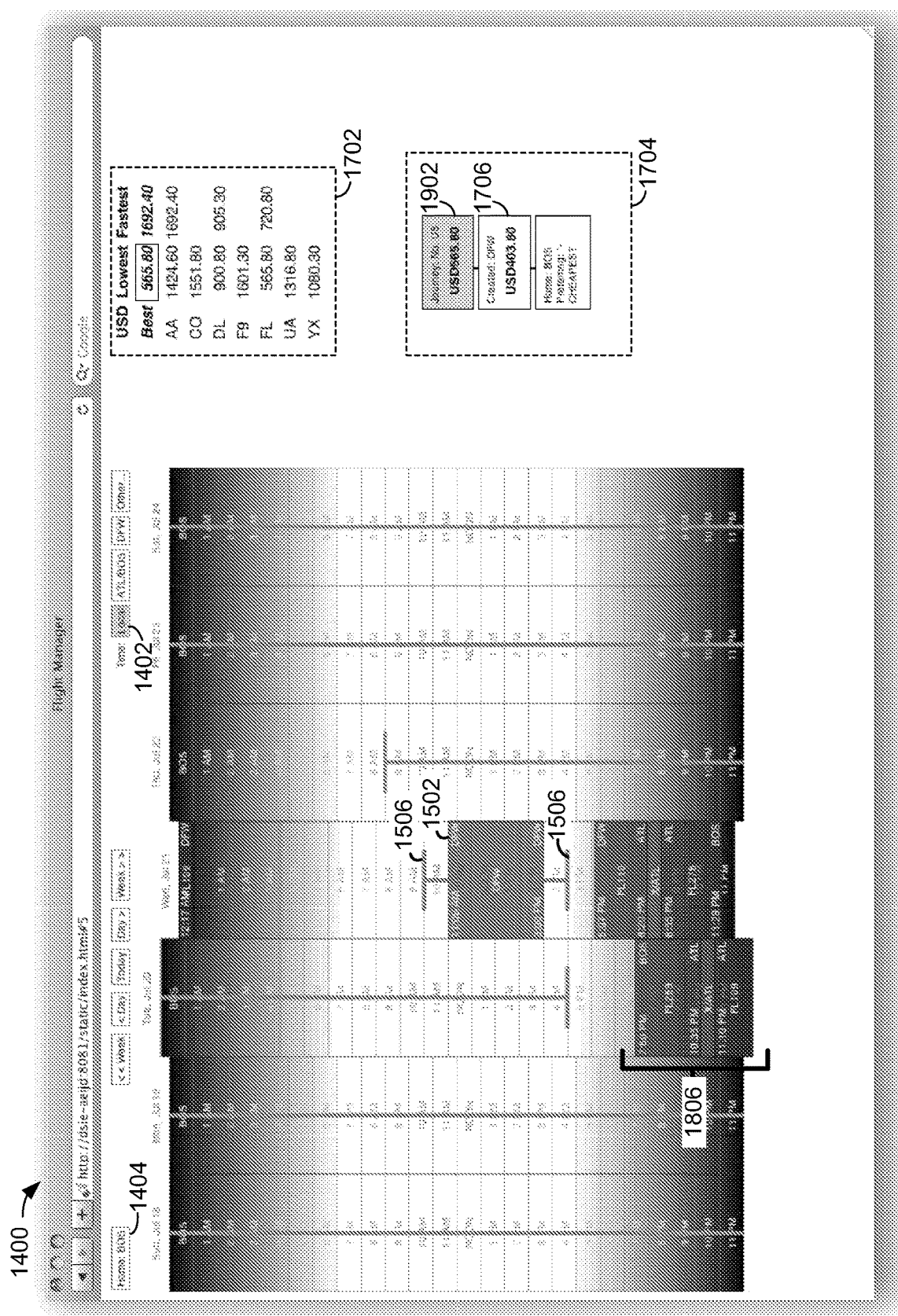
FIG. 19 is another example GUI, in accordance with certain example embodiments.

In FIG. 19, calendar 1400 of FIG. 18 is updated to display a new solution that reflects user-selected carrier restrictions for itinerary portion 1806. History information 1704 includes a corresponding new entry 1902 having an increased itinerary price.

Figure 20:
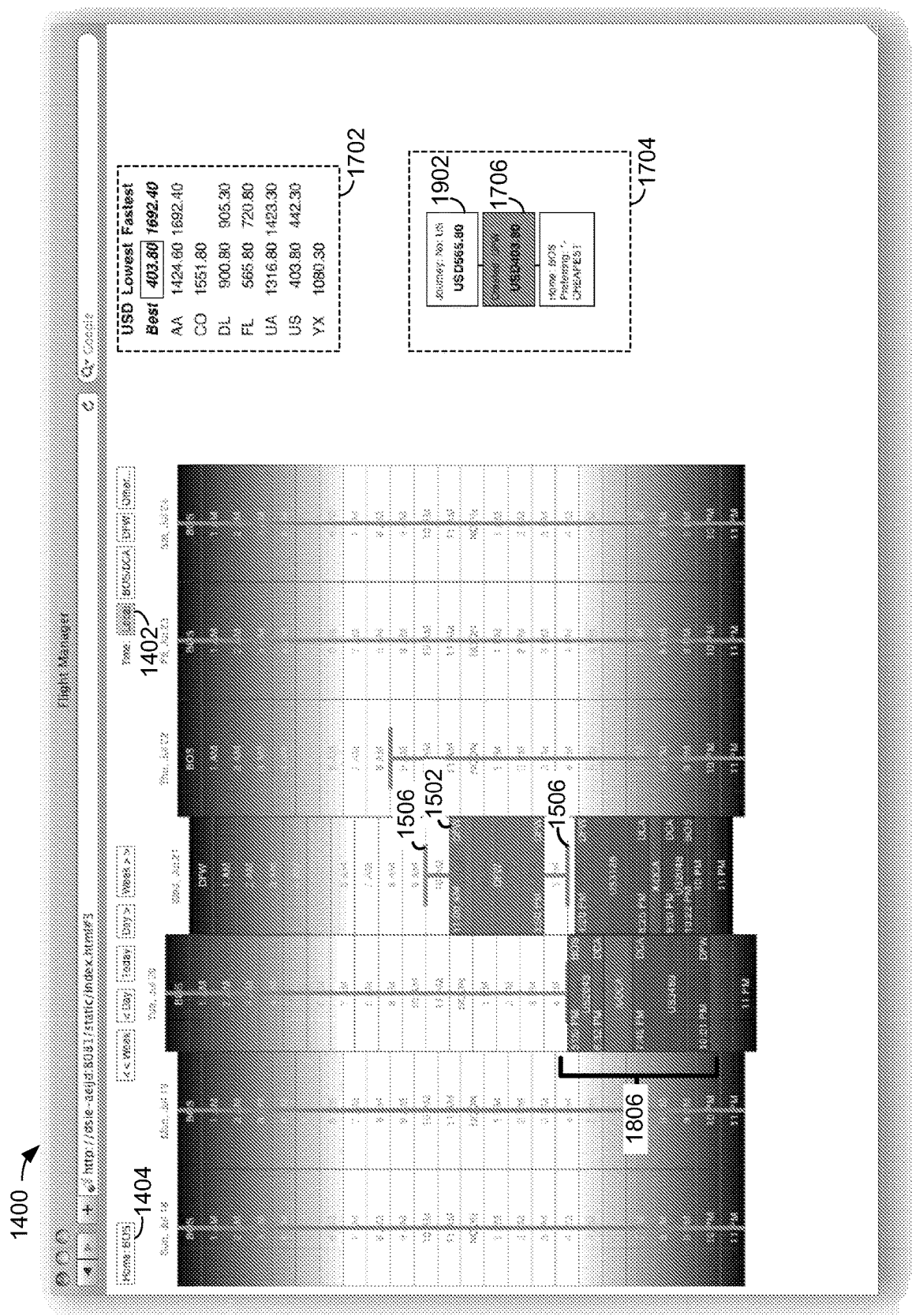
FIG. 20 is another example GUI, in accordance with certain example embodiments.

In FIG. 20, a history entry 1706 is selected and calendar 1400 is updated or refreshed to display the corresponding itinerary entries of FIG. 18.

Figure 21:
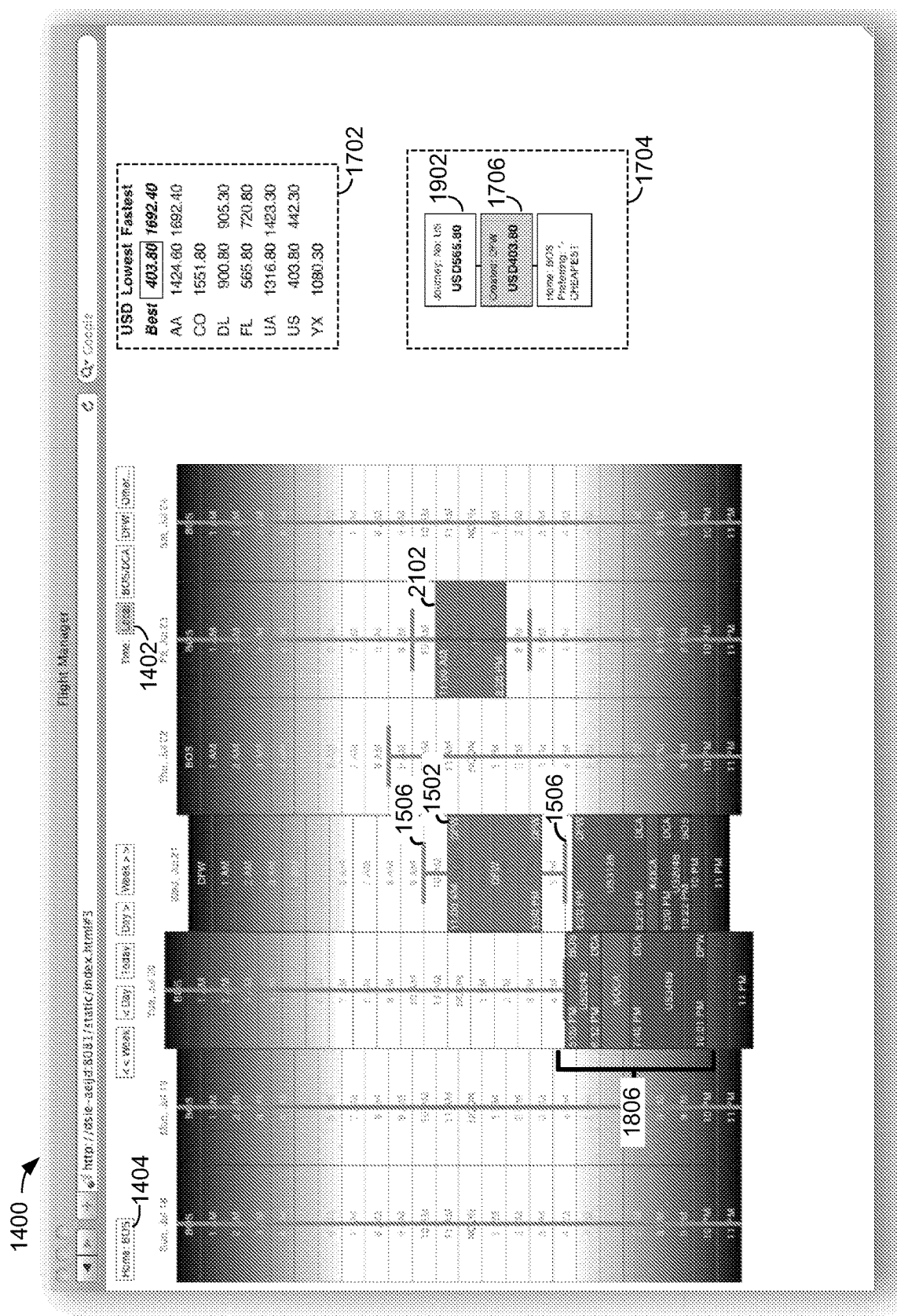
FIG. 21 is another example GUI, in accordance with certain example embodiments.
Figure 22:
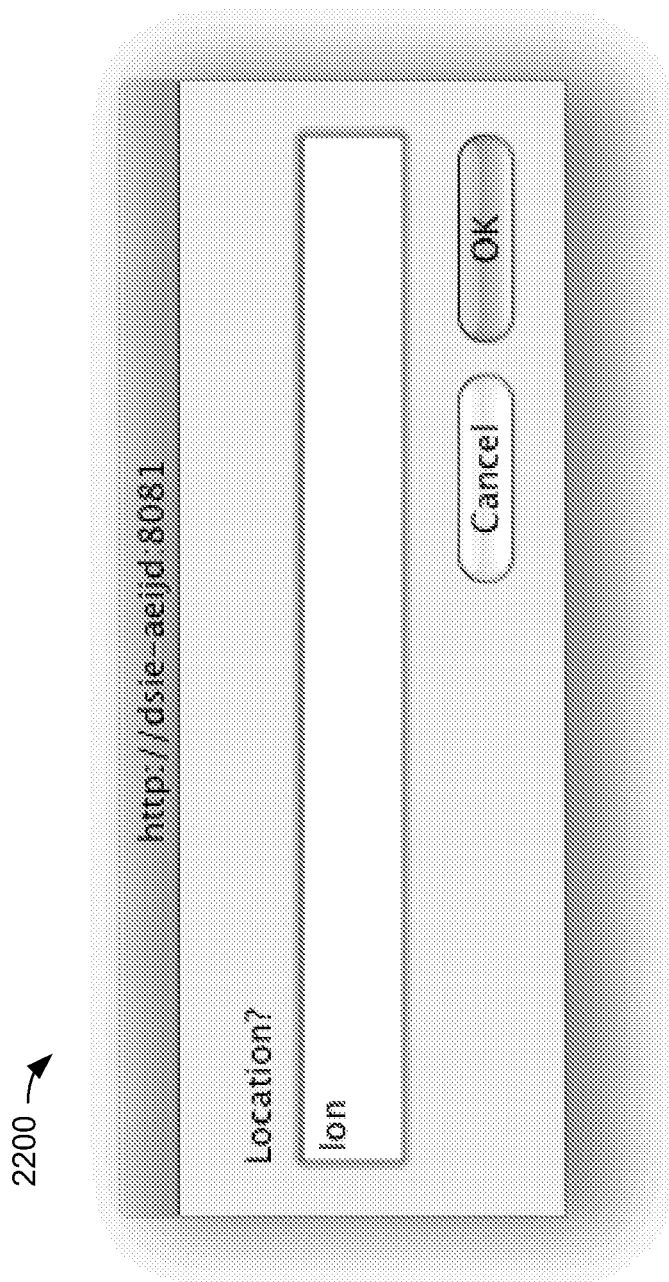
FIG. 22 is another example meeting location pop-up element, in accordance with certain example embodiments.

In FIG. 21, calendar 1400 is populated with a second meeting entry 2102.

In FIG. 22, a meeting location pop-up window 2200 is populated with LON, for London.

Figure 23:
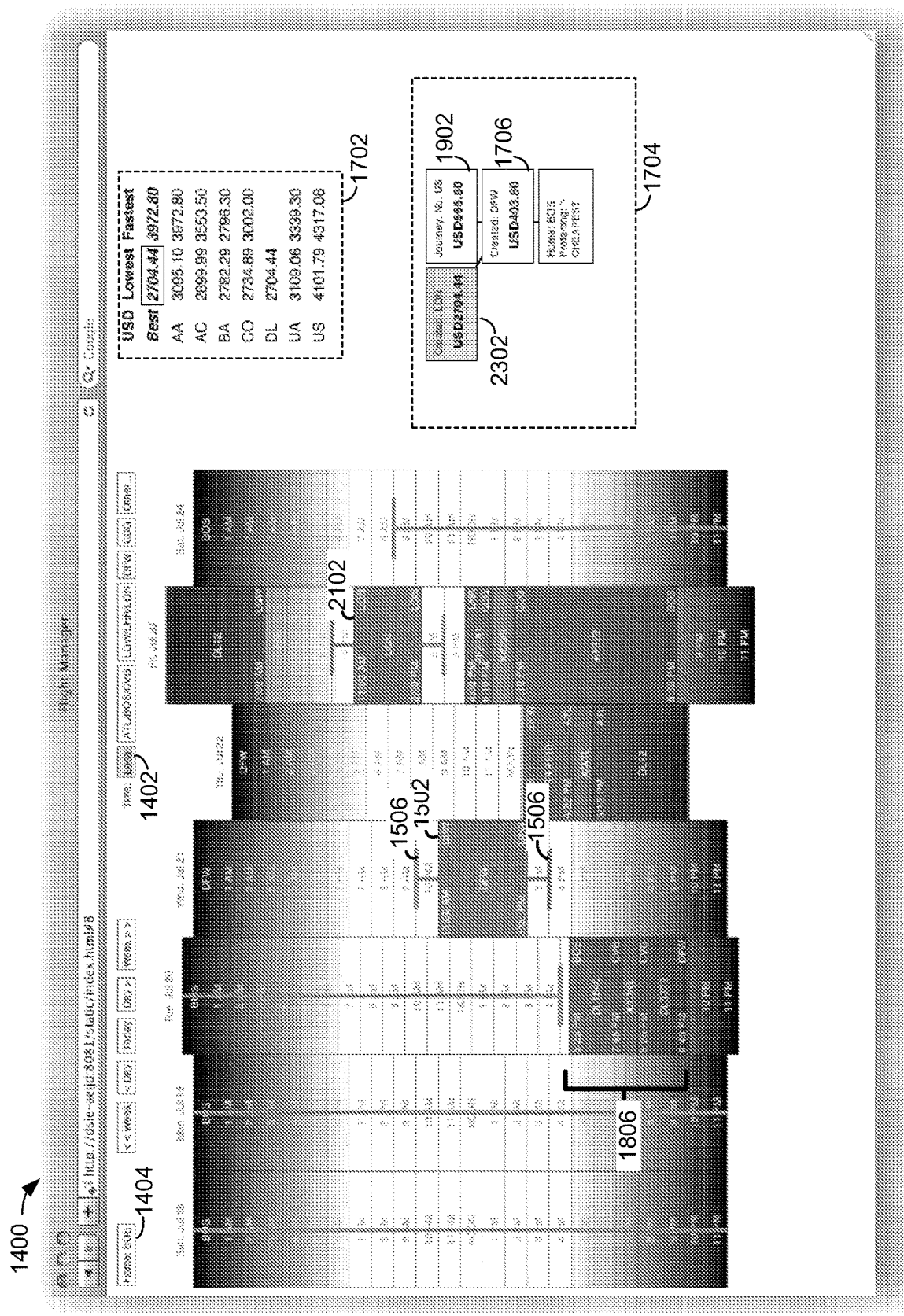
FIG. 23 is another example GUI, in accordance with certain example embodiments.

In FIG. 23, meeting entry 2102 is updated to reflect London, and calendar is populated with itinerary entries to accommodate meeting 2102, and to include a corresponding branch entry 2302 within history information 1704. In FIG. 23, calendar 1400 is displayed with respect to local or Boston time, so some days appear longer or shorter than others.

Figure 24:
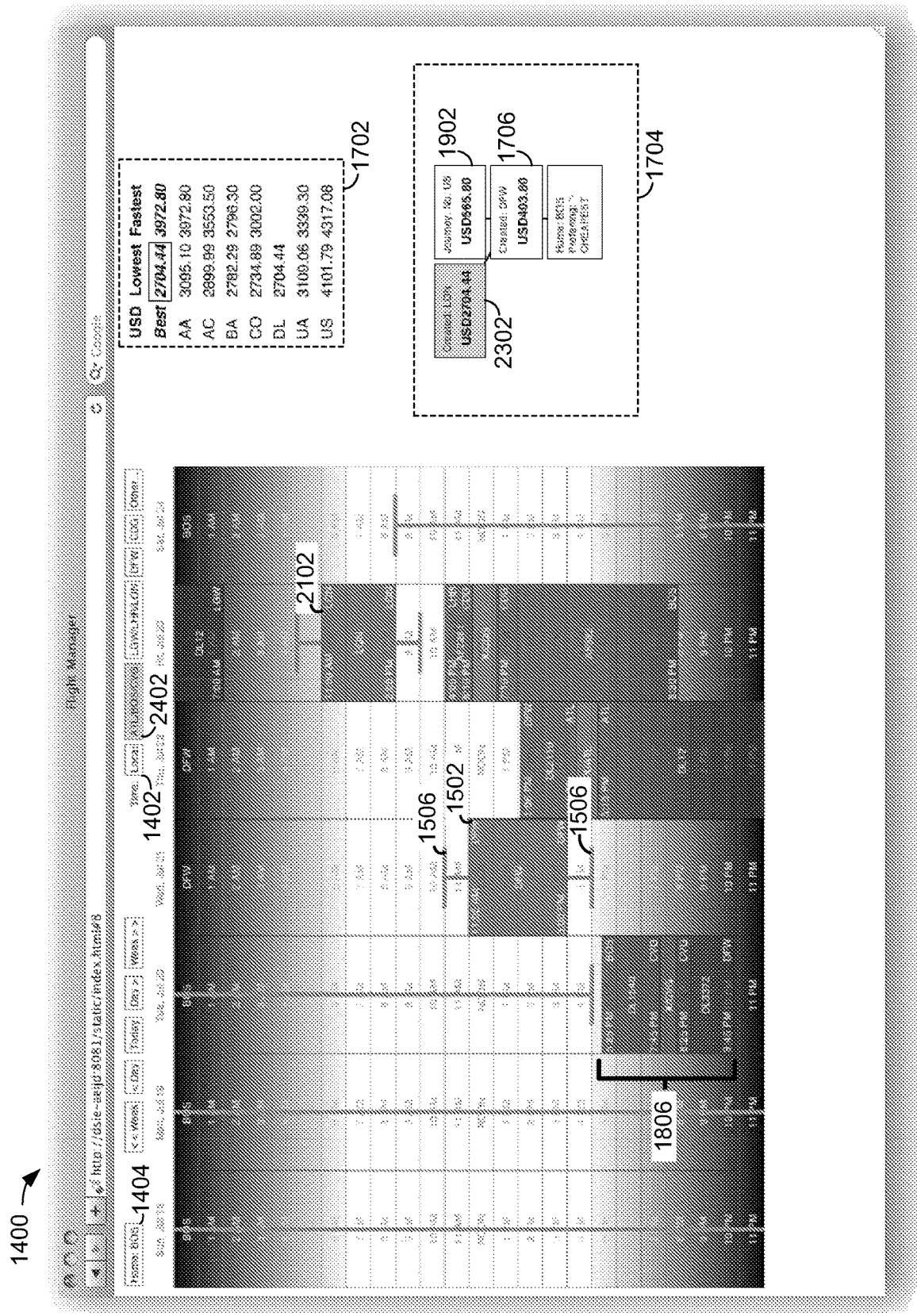
FIG. 24 is another example GUI, in accordance with certain example embodiments.

In FIG. 24, a button 2402, illustrated here as "ATL/BOS/CVG," is selected to cause calendar 1400 to display itinerary entries with respect to corresponding time-zones.

Figure 25:
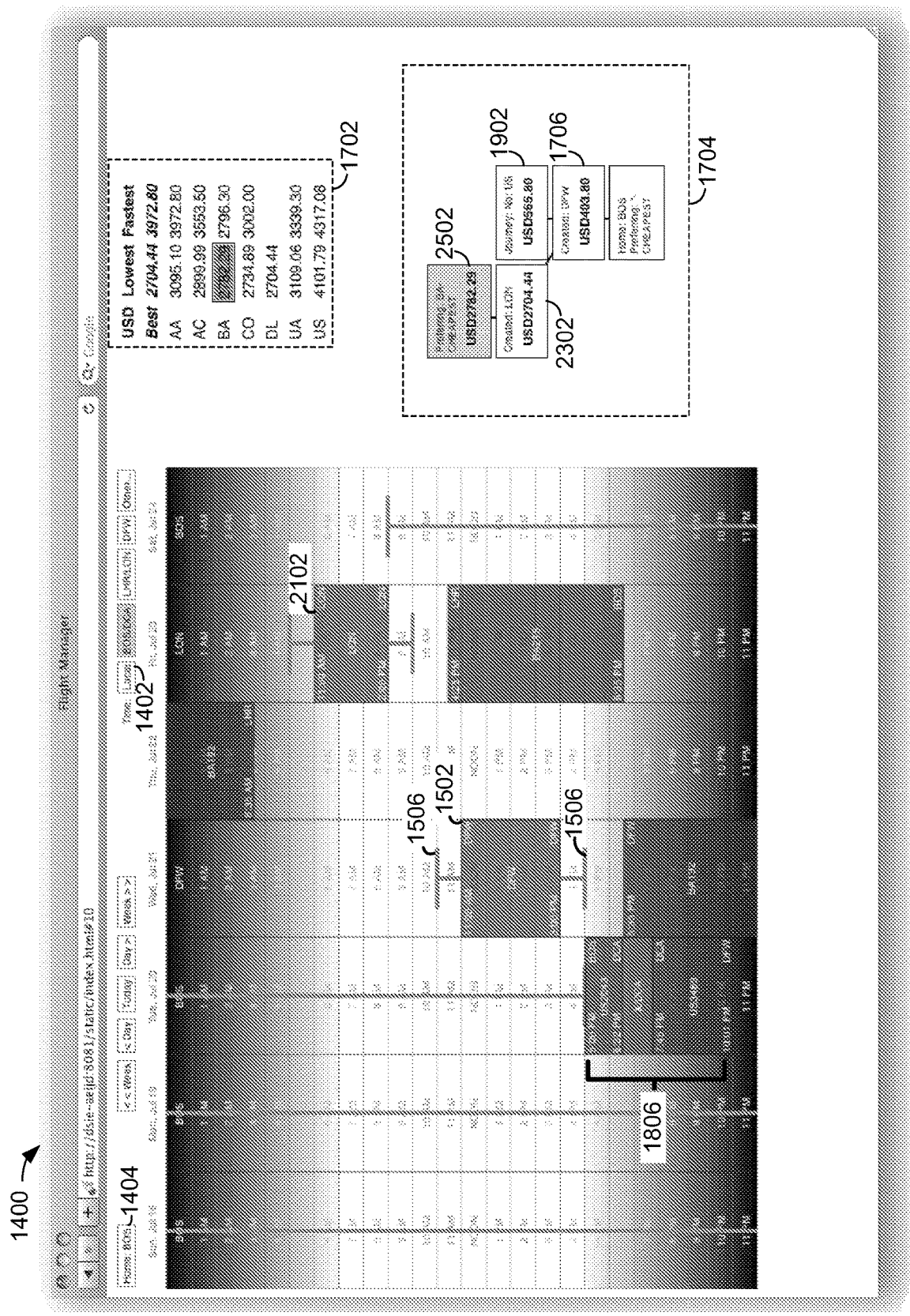
FIG. 25 is another example GUI, in accordance with certain example embodiments.

In FIG. 25, a lowest fare entry for a carrier "BA" is selected from itinerary choices 1702, calendar 1400 is updated accordingly, and history information 1704 updated with a corresponding new entry 2502.

Figure 26:
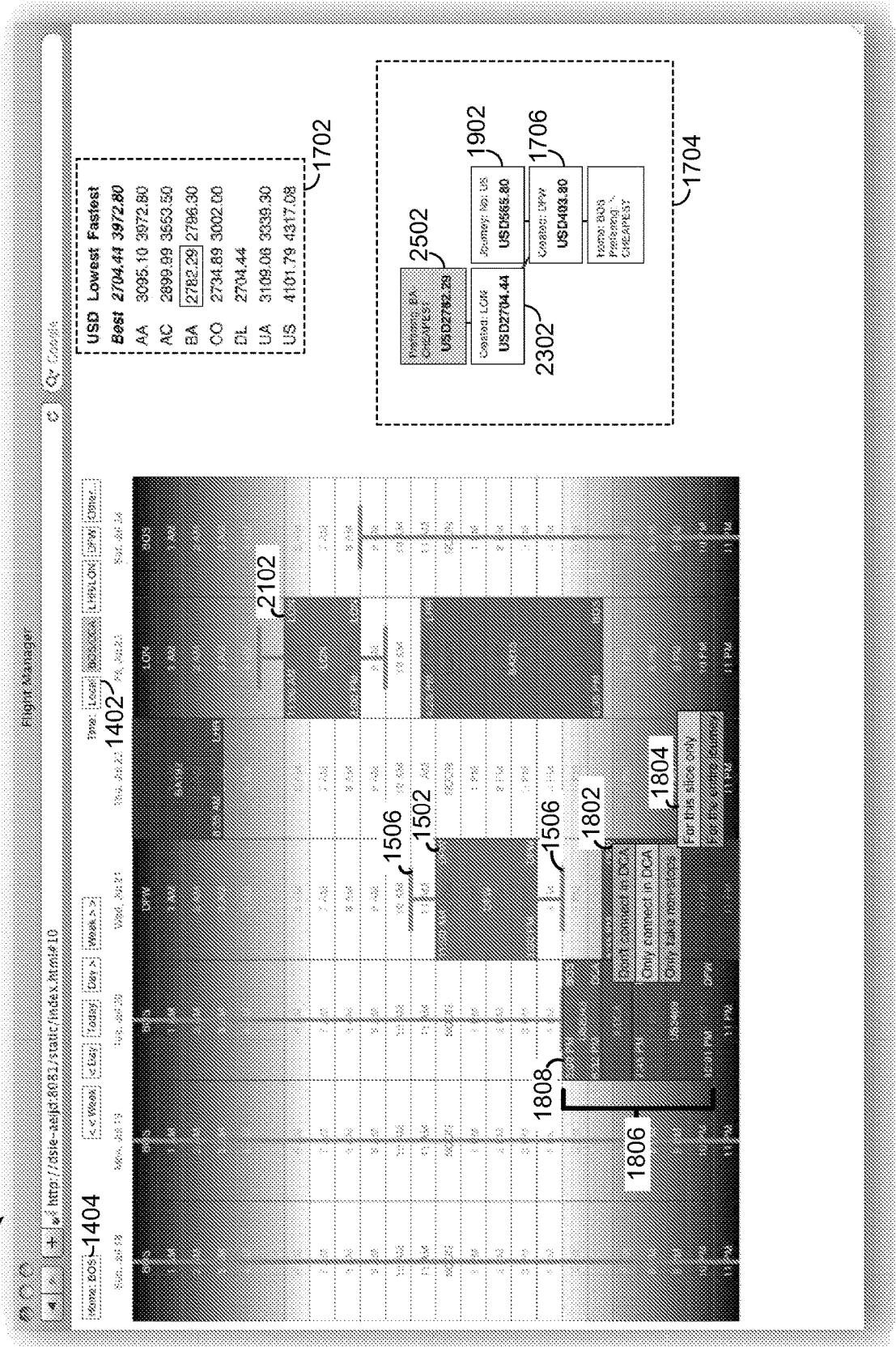
FIG. 26 is another example GUI, in accordance with certain example embodiments.

In FIG. 26 calendar 1400 includes pop-up windows 2602 and 2604. Pop-up window 2602 may be activated by selecting an itinerary entry, such as an itinerary entry 1808 of an itinerary portion 1806. Pop-up window 2602 permits a user to utilize or omit a particular airport for connecting flights. Pop-up window 2604 permits the user to apply the restriction to itinerary portion 1806 or to an entire journey or itinerary.

Figure 27:
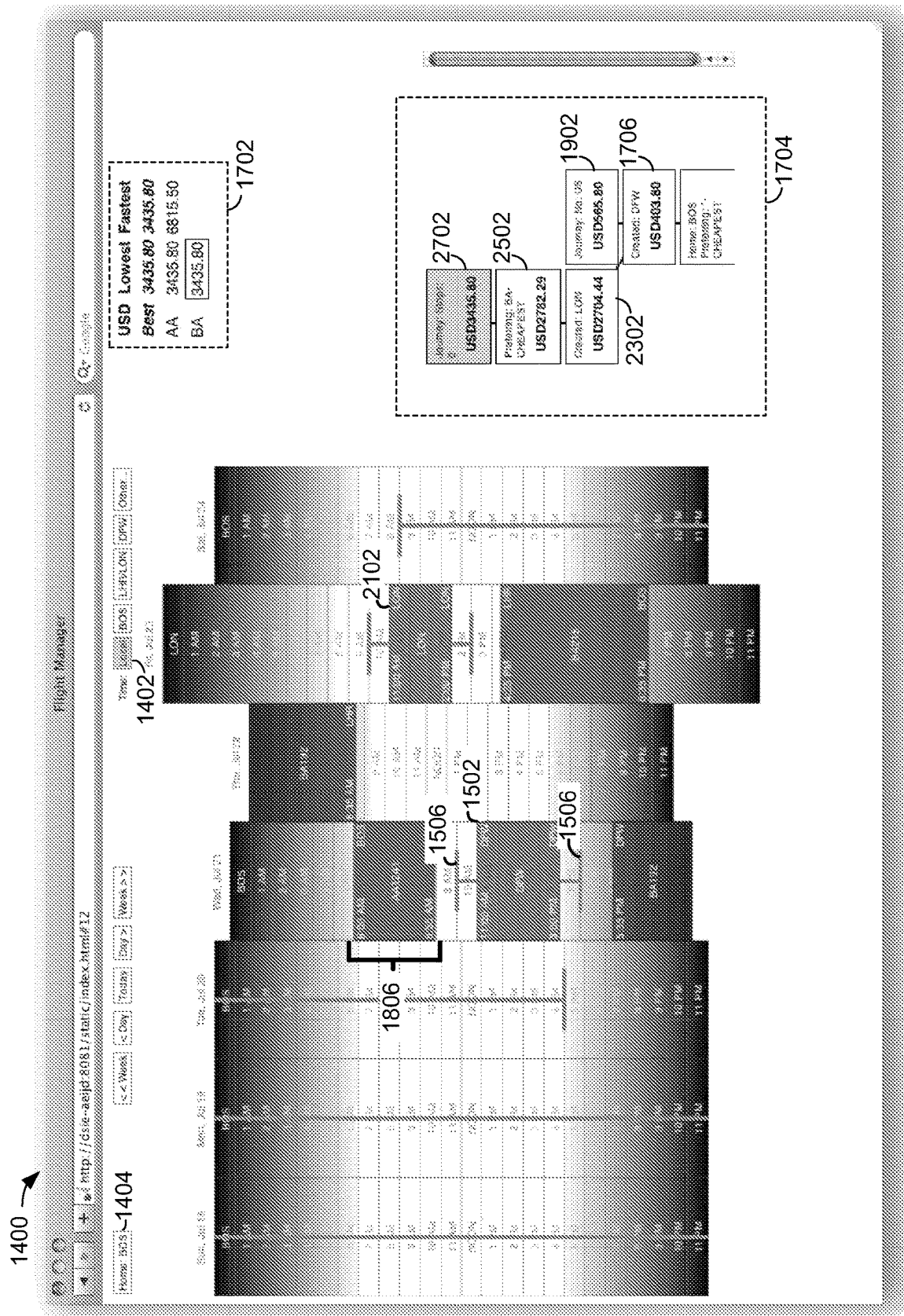
FIG. 27 is another example GUI, in accordance with certain example embodiments.

In FIG. 27, calendar 1400 of FIG. 26 is updated to show a new solution for itinerary portion 1806 that reflects user-selected connecting flight restrictions. History information 1704 includes a corresponding new entry 2702.

Figure 28:
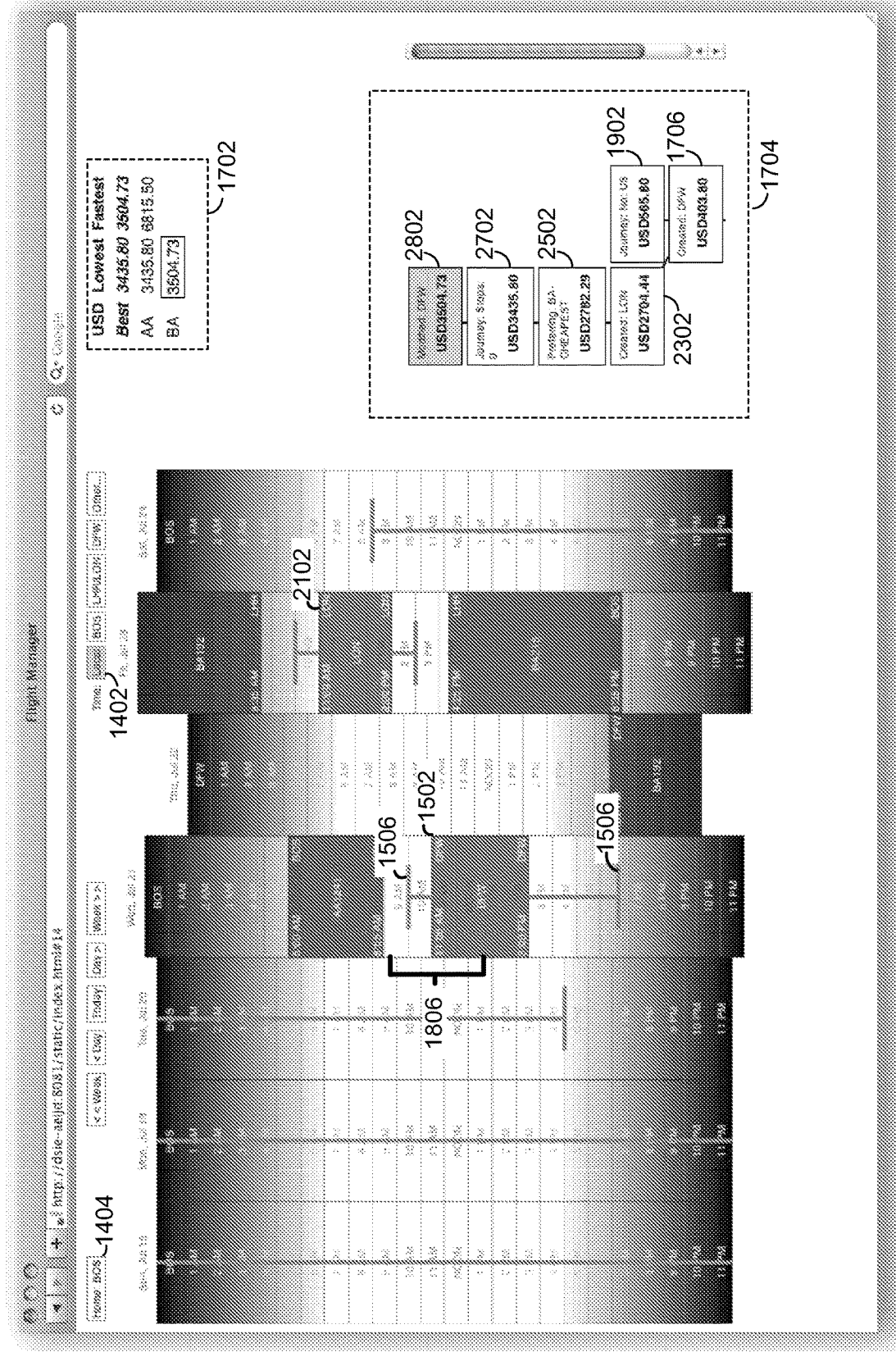
FIG. 28 is another example GUI, in accordance with certain example embodiments.

In FIG. 28, buffer 1506 is dragged to extend the available time prior to departure. Itinerary entries of calendar 1400 are updated accordingly, and history information 1704 is updated to include a new entry 2802.

Figure 29:
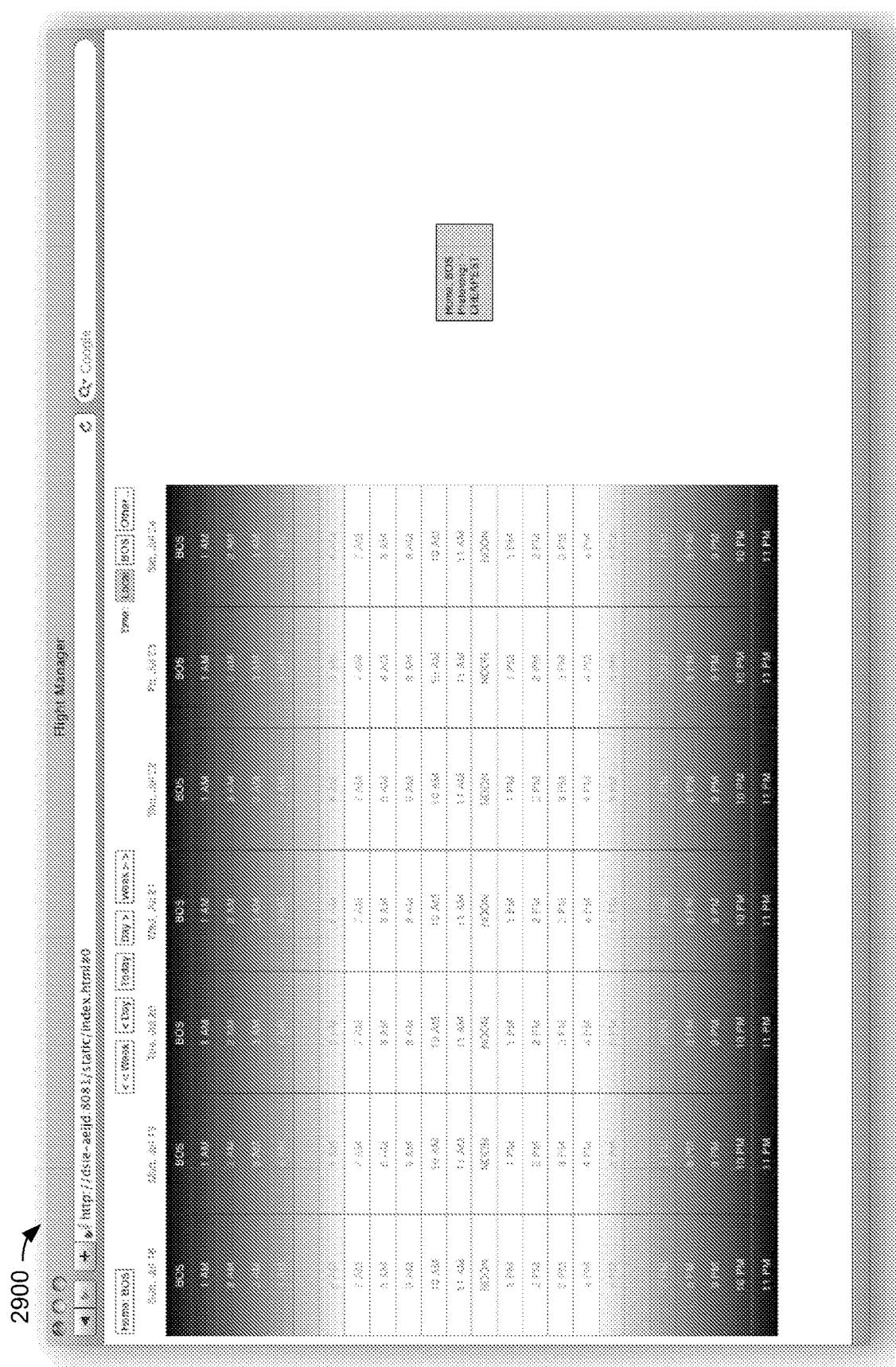
FIG. 29 is another example GUI, in accordance with certain example embodiments.

FIG. 29 is a GUI of a calendar 2900, which may be similar to calendar 1400 in FIG. 14. FIGS. 30, 32, 33, and 35 are GUIs of calendar 2900. FIGS. 31 and 34 are GUIs of meeting location pop-up windows. FIGS. 29-35 are described below with respect to another example itinerary planning procedure.

Figure 30:
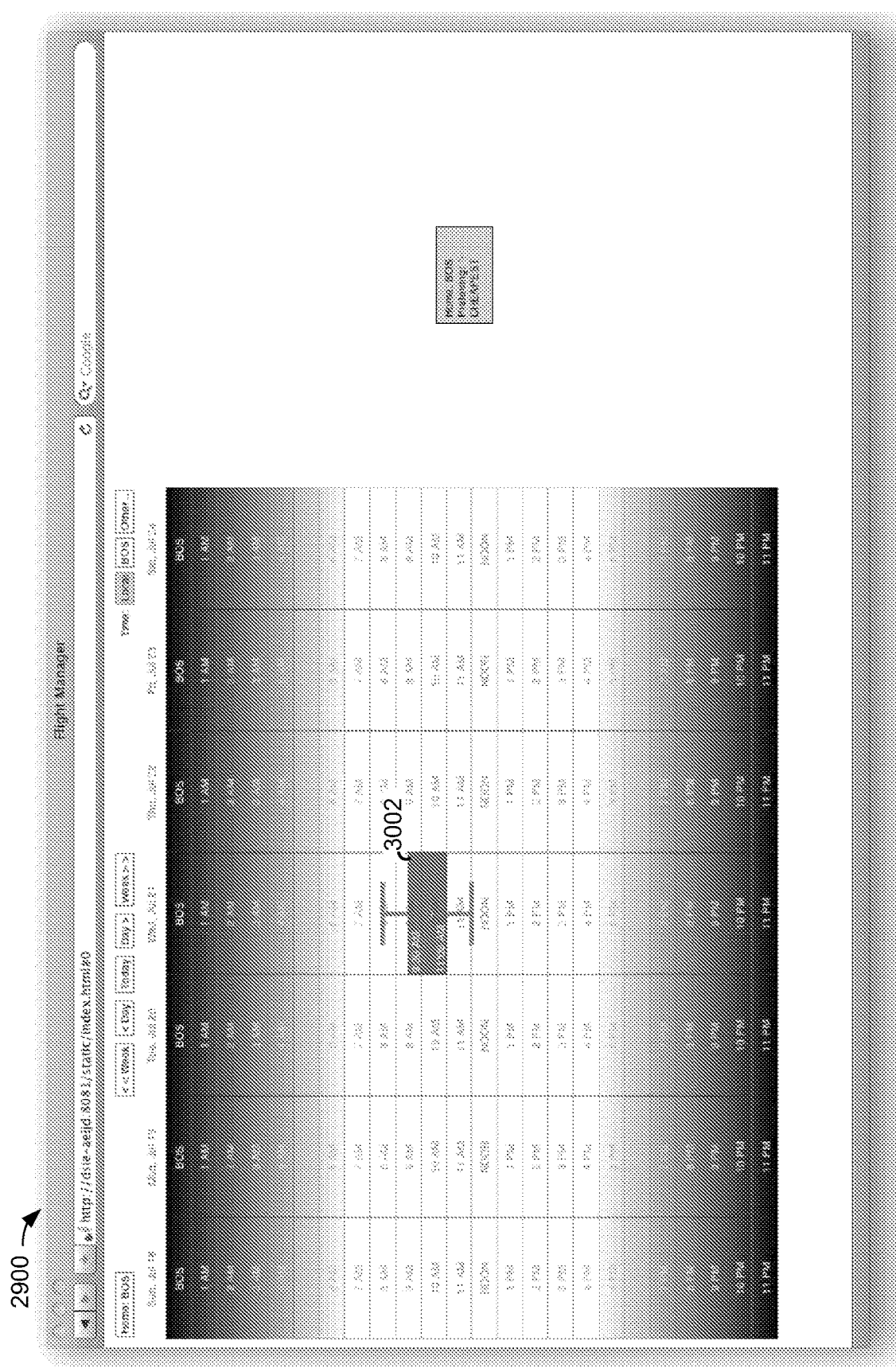
FIG. 30 is another example GUI, in accordance with certain example embodiments.
Figure 31:
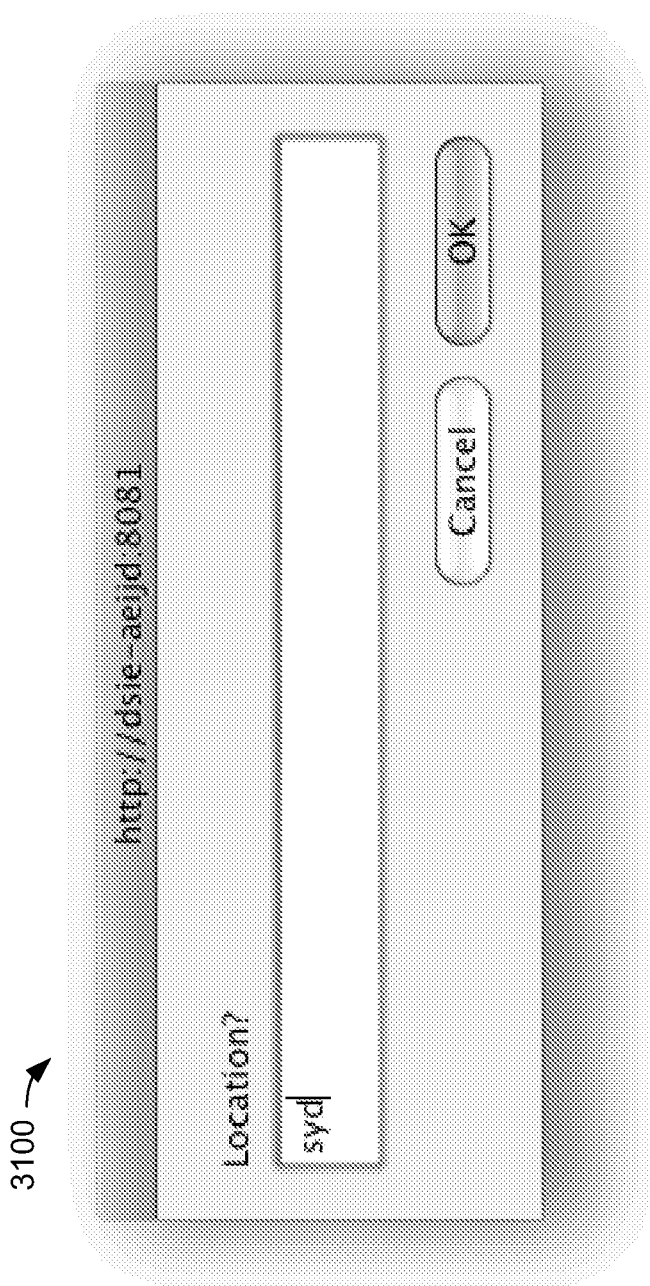
FIG. 31 is another example location pop-up element, in accordance with certain example embodiments.

In FIG. 30, calendar 2900 includes a schedule or meeting entry 3002, at 9:30 AM local time.

In FIG. 31, a meeting location pop-up window 3100 is populated with SYD, for Sydney.

Figure 32:
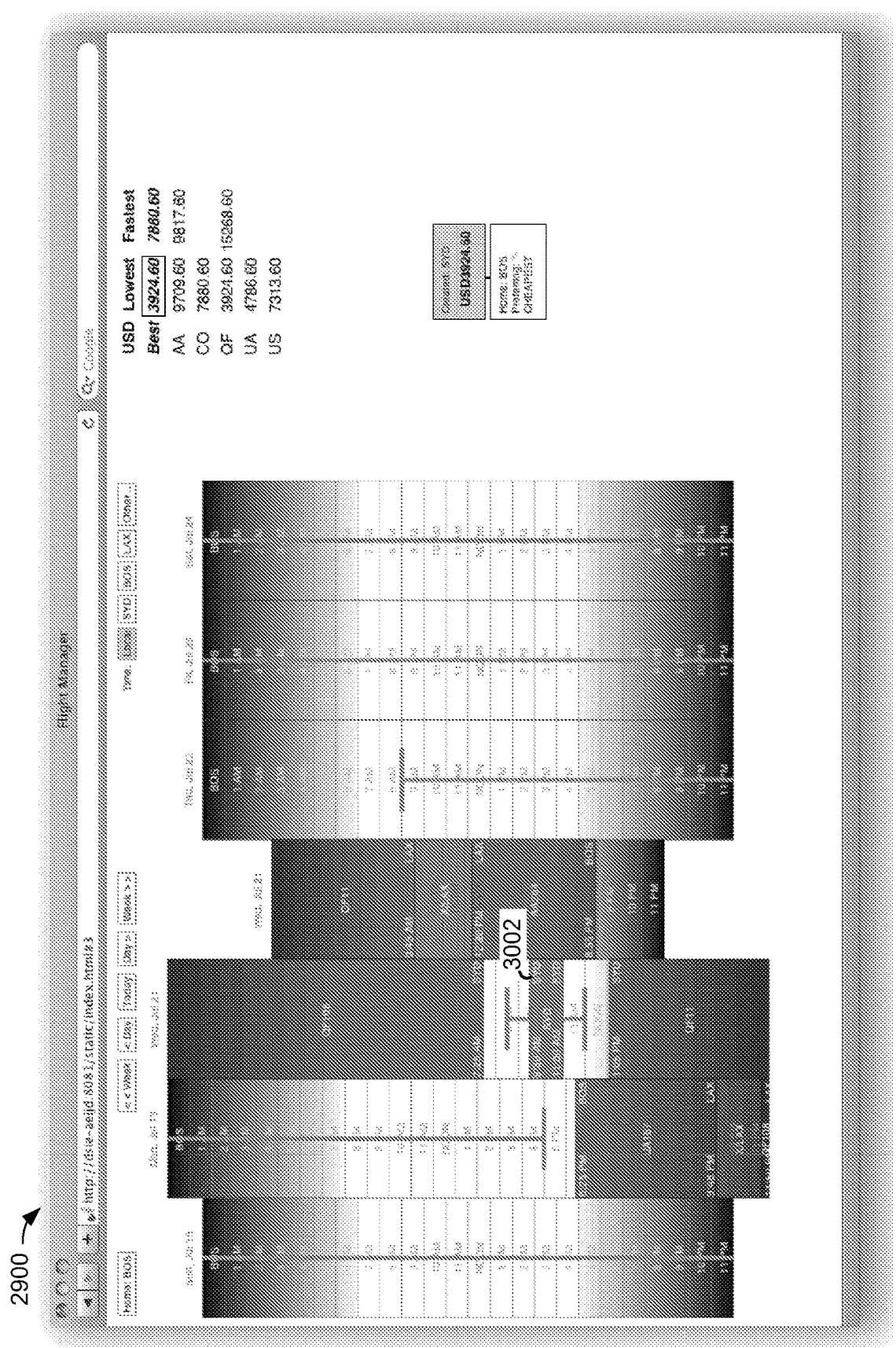
FIG. 32 is another example GUI, in accordance with certain example embodiments.

In FIG. 32, meeting entry 3002 is updated to reflect Sydney, and calendar 2900 is populated with itinerary entries to travel from Boston, to meeting 3002 in Sydney, and back to Boston.

In FIG. 32, calendar 2900 does not include a column for Tuesday, July 20, and includes two columns for Wednesday, July 21. This is due to the itinerary crossing the international date line, and due to calendar 2900 displaying itinerary and meeting entries in respective local times. Thus, when traveling to Sydney, the user departs Monday, July 19, Boston-time, and arrives Wednesday, July 21, Sydney-time. In crossing the international date line, Tuesday, July 20, is skipped. When returning to Boston, the user departs on Wednesday, July 21, Sydney-time, and arrives Wednesday, July 21, Boston-time. In this case, the user departs Sydney mid-day Wednesday. During the flight, darkness falls, the sun rises, and when the flight has crossed the international dateline, it is Wednesday again for the passengers of the flight.

Calendar 2900 thus reflects the view of the passenger, taking into account times of lightness and darkness, splitting days at midnight local time, and displaying some days as relatively shorter or longer than other days.

Figure 33:
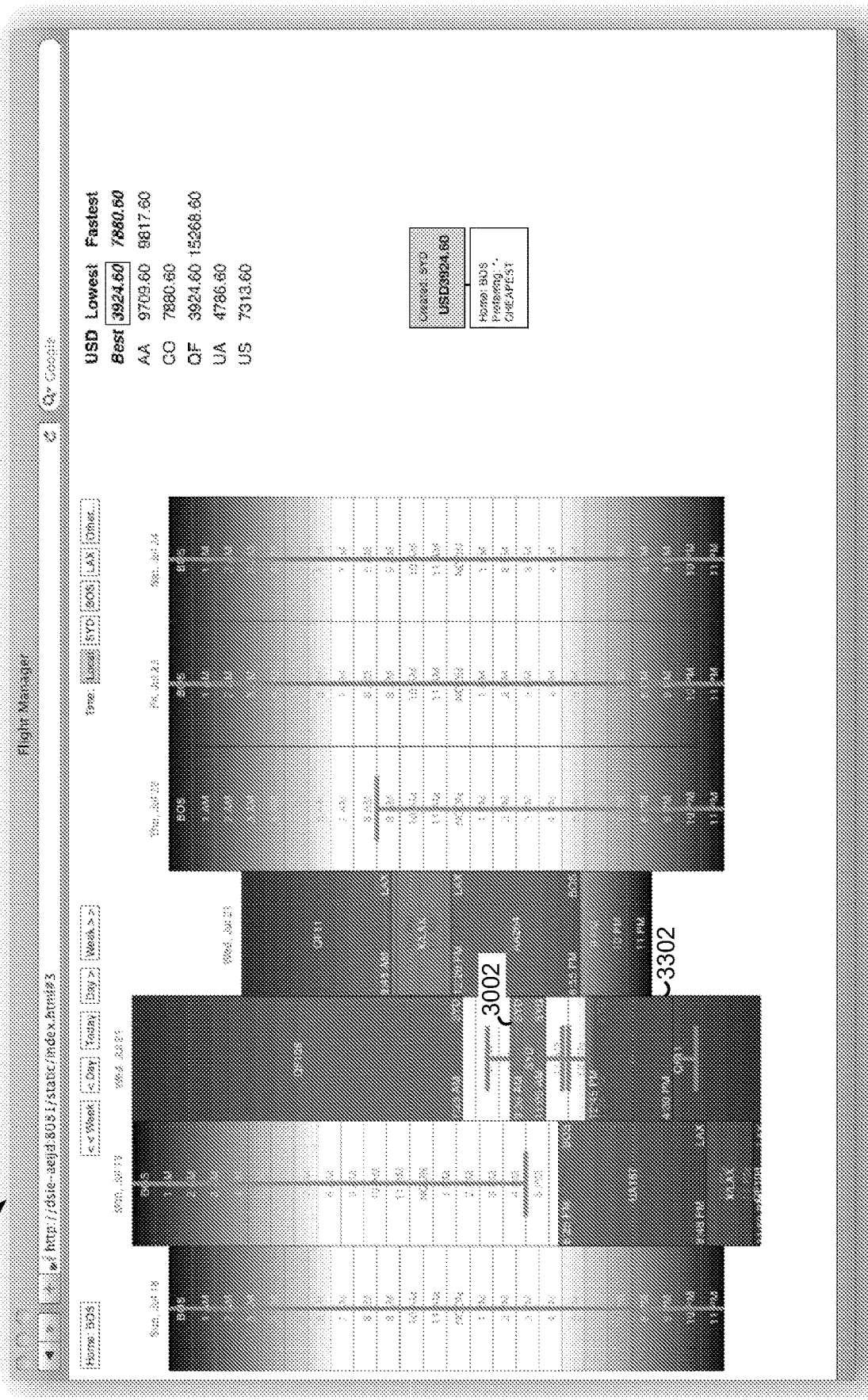
FIG. 33 is another example GUI, in accordance with certain example embodiments.
Figure 34:
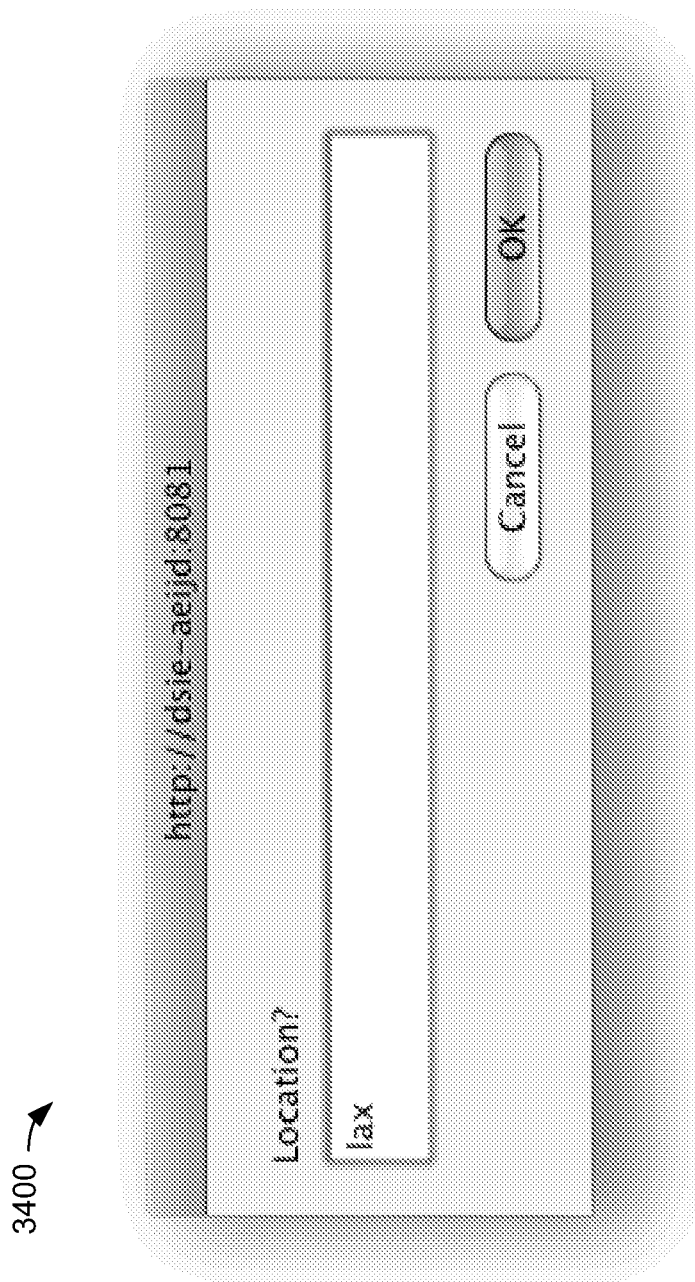
FIG. 34 is another example location pop-up element, in accordance with certain example embodiments.

In FIG. 33, calendar 2900 is populated with a second meeting entry 3302, scheduled for 12:45 PM, Wednesday, July 21.

In FIG. 34, a meeting location pop-up window 3400 is populated with LAX, for Los Angeles.

Figure 35:
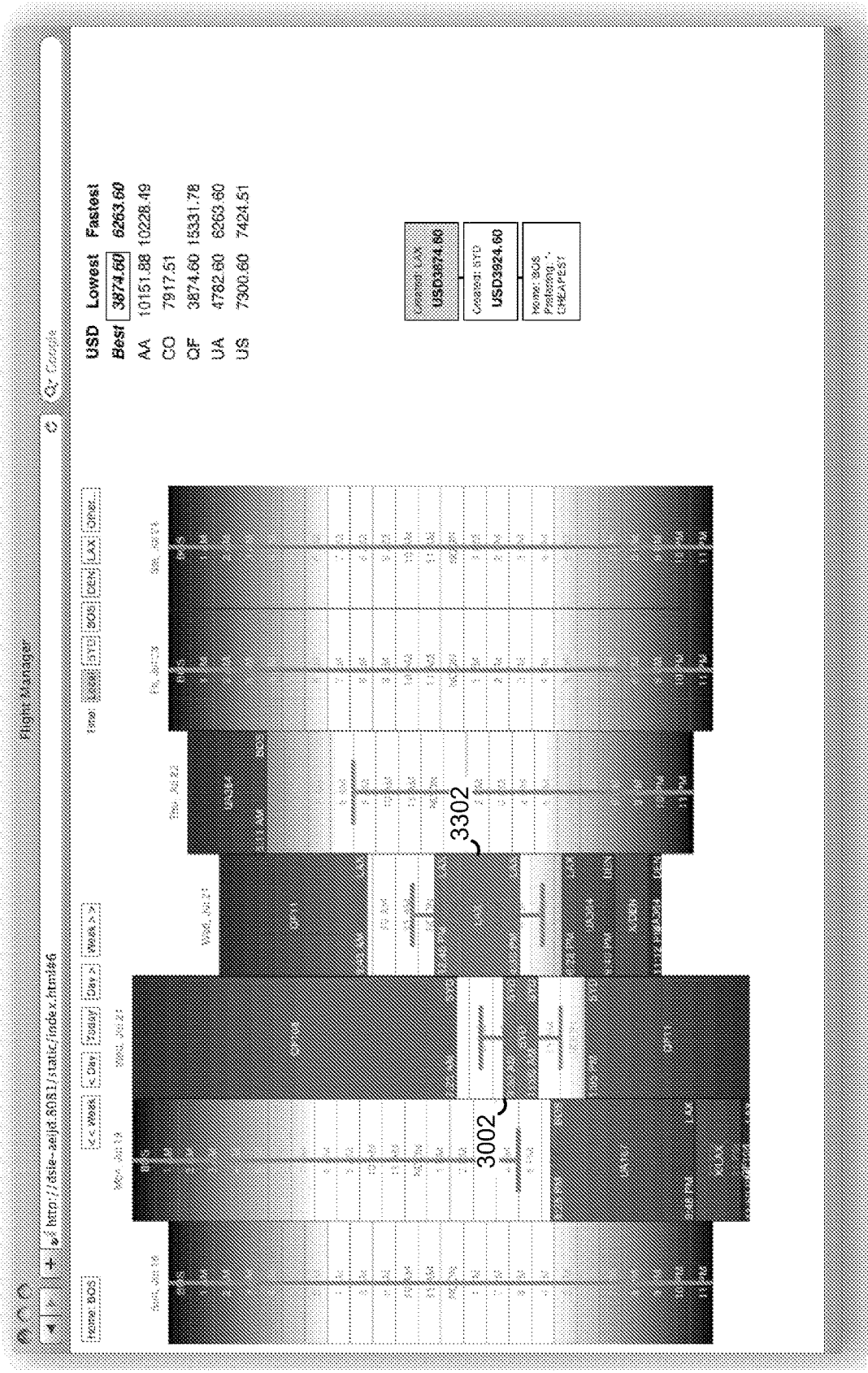
FIG. 35 is another example GUI, in accordance with certain example embodiments.

In FIG. 35, meeting entry 3302 is updated to identify LAX. In addition, although meeting entry 3302 was input as 12:45 in the left-hand column of Wednesday, July 21 in FIG. 31, since the Los Angeles location of meeting entry 3302 is on the "local" side of the international dateline, calendar 2900 is updated to display meeting entry 3302 in the right-hand column or instance of Wednesday, July 21, at the corresponding local time.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. Various changes in form and detail may be made therein without departing from the spirit and scope of the methods and systems disclosed herein. Thus, the breadth and scope of the claims should not be limited by any of the example embodiments disclosed herein.

What is claimed is:

1. A computer-implemented method to cause display devices to render user interfaces that present selectable multi-destination itineraries to users, comprising:
   providing, by operation of a computer, instructions causing a display device to render a travel itinerary user interface, the travel itinerary user interface comprising:
   a calendar region comprising a plurality of selectable date cells;
   a destination region, the destination region displayed proximate to a date cell in the calendar region in response to a user selection of the date cell, the destination region comprising selectable destination options;
   an itinerary region displayed proximate to the calendar region, the itinerary region displaying an itinerary generated in response to selection by the user of the date cells and destinations in the calendar region, the itinerary region comprising one or more information fields associated with each flight in a generated itinerary;
   one or more user configurable parameter regions displayed within the calendar region, the itinerary region, or both, each user configurable parameter region comprising one or more user configurable parameters that modify the generated itinerary in response to user input regarding the one or more configurable parameters;
   one or more display icons displayed proximate to a date cell in the calendar region in response to user selection of the date cell, the one or more display icons corresponding to a flight in the generated itinerary on the date cell the display icon is displayed proximate to and configured to be responsive to a drag and drop operation that moves the one or more display icons from a set of first date selections to a second set of date selections,
   wherein the itinerary region is configured to automatically update in response to changes to the one or more display icons, the one or more user configurable parameter regions, or both.

2. The method of claim 1, wherein the calendar region is configured to display multiple selectable time slots per date cell, the selectable time slots indicating when selected a flight time, an event, or both.

3. The method of claim 2, wherein the selectable time slots are configured to be responsive to a drag or drop operation that changes a flight travel time, an event, or both, wherein the itinerary region is configured to automatically update in response to changes to a flight travel time slot.

4. The method of claim 1, wherein the one or more display icons are positioned horizontally or vertically relative to the date cell to indicate a relative time of departure or arrival and is repositioned in response to a change in flight departure time or flight arrival time.

5. The method of claim 1, wherein the calendar region further comprises one or more visual destination indicators within or proximate to a date cell or set of date cells, the visual destination indicators indicating a destination the user will be located on the date cell or set of date cells.

6. The method of claim 1, wherein the one or more user configurable parameters comprises an airline carrier parameter indicating a preferred airline or an excluded airline, a flight arrival time parameter, a flight departure time parameter, a permissible number of flight legs parameter, one or more flight service parameters, a seat assignment parameter, and a fare price or price range parameter.

7. A device to render user interfaces that present selectable multi-destination itineraries to users, the device comprising:
   a display device that is configured to render a user interface, the user interface comprising:
   a calendar region comprising a plurality of selectable date cells;
   a destination region, the destination region displayed proximate to a date cell in the calendar region in response to a user selection of the date cell, the destination region comprising selectable destination options;
   an itinerary region displayed proximate to the calendar region, the itinerary region displaying an itinerary generated in response to selection by the user of the date cells and destinations in the calendar region, the itinerary region comprising one or more information fields associated with each flight in a generated itinerary;

one or more user configurable parameter regions displayed within the calendar region, the itinerary region, or both, each user configurable parameter region providing one or more user configurable parameters that modify the generated itinerary in response to user input regarding the one or more configurable parameters;

one or more display icons displayed proximate to a date cell in the calendar region in response to user selection of the date cell, the one or more display icons corresponding to a flight in the generated itinerary on the date cell the display icon is displayed proximate to and configured to be responsive to a drag and drop operation that moves the one or more display icons from a set of first date selections to a second set of date selections, wherein the itinerary region is configured to automatically update in response to changes to the one or more display icons, the one or more user configurable parameter regions, or both.

8. The device of claim 7, wherein the calendar region is configured to display multiple selectable time slots per date cell, the selectable time slots indicating when selected a flight time, an event, or both.

9. The device of claim 8, wherein the selectable time slots are configured to be responsive to a drag or drop operation that changes a flight travel time, an event, or both, wherein the itinerary region is configured to automatically update in response to changes to a flight travel time slot.

10. The device of claim 7, wherein the one or more display icons are positioned horizontally or vertically relative to the date cell to indicate a relative time of departure or arrival and is repositioned in response to a change in flight departure time or flight arrival time.

11. The device of claim 7, wherein the calendar region may further comprise one or more visual destination indicators within or proximate to a date cell or set of date cells, the visual destination indicators indicating a destination the user will be located on the date cell or set of date cells.

12. The device of claim 7, wherein the one or more user configurable parameters comprises an airline carrier parameter indicating a preferred airline or an excluded airline, a flight arrival time parameter, a flight departure time parameter, a permissible number of flight legs parameter, one or more flight service parameters, a seat assignment parameter, and a fare price or price range parameter.

13. A computer-program product, comprising:
a non-transitory computer-readable storage device having computer-executable program instructions embodied thereon that when executed by a computer cause the computer to generate a user interface comprising:
a calendar region comprising a plurality of selectable date cells;
a destination region, the destination region displayed proximate to a date cell in the calendar region in response to a user selection of the date cell, the destination region comprising selectable destination options;
an itinerary region displayed proximate to the calendar region, the itinerary region displaying an itinerary generated in response to selection by the user of the date cells and destinations in the calendar region, the itinerary region comprising one or more information fields associated with each flight in a generated itinerary;
one or more user configurable parameter regions displayed within the calendar region, the itinerary region, or both, the user configurable parameter region comprising one or more user configurable parameters that modify the generated itinerary in response to user input regarding the one or more configurable parameters;
one or more display icons displayed proximate to a date cell in the calendar region in response to user selection of the date cell, the one or more display icons corresponding to a flight in the generated itinerary on the date cell the display icon is displayed proximate to and configured to be responsive to a drag and drop operation that moves the one or more display icons from a set of first date selections to a second set of date selections, wherein the itinerary region is configured to automatically update in response to changes to the display icons, the one or more user configurable parameter regions, or both.

14. The computer-program product of claim 13, wherein the calendar region is configured to display multiple selectable time slots per date cell, the selectable time slots indicating when selected a flight time, an event, or both.

15. The computer-program product of claim 14, wherein the selectable time slots are configured to be responsive to a drag or drop operation that changes a flight travel time, an event, or both, wherein the itinerary region is configured to automatically update in response to changes to a flight travel time slot.

16. The computer-program product of claim 13, wherein the calendar region may further comprise one or more visual destination indicators within or proximate to a date cell or set of date cells, the visual destination indicators indicating a destination the user will be located on the date cell or set of date cells.

17. The computer-program product of claim 13, wherein the one or more user configurable parameters comprises an airline carrier parameter indicating a preferred airline or an excluded airline, a flight arrival time parameter, a flight departure time parameter, a permissible number of flight legs parameter, one or more flight service parameters, a seat assignment parameter, and a fare price or price range parameter.

* * * * *